(12) United States Patent (10) Patent No.: US 9,706,708 B2
Smith et al. (45) Date of Patent: Jul. 18, 2017

(54) CONTROLLING A POSITIONING SYSTEM FOR AN AGRICULTURAL IMPLEMENT

(71) Applicant: HONEY BEE MANUFACTURING LTD., Frontier (CA)

(72) Inventors: Scott Douglas Smith, Frontier (CA); Glenn Raymond Honey, Bracken (CA)

(73) Assignee: HONEY BEE MANUFACTURING LTD., Frontier, SK (CA)

( * ) Notice: Subject to any disclaimer, the term of this patent is extended or adjusted under 35 U.S.C. 154(b) by 0 days.

(21) Appl. No.: 14/857,618

(22) Filed: Sep. 17, 2015

(65) Prior Publication Data

US 2016/0262307 A1 Sep. 15, 2016

(30) Foreign Application Priority Data

Mar. 13, 2015 (CA) ...................................... 2885046

(51) Int. Cl.
*A01D 41/127* (2006.01)
*A01D 41/14* (2006.01)
*A01D 41/12* (2006.01)
*A01B 63/00* (2006.01)

(52) U.S. Cl.
CPC ........... *A01D 41/127* (2013.01); *A01D 41/12* (2013.01); *A01D 41/14* (2013.01); *A01D 41/145* (2013.01); *A01B 63/00* (2013.01)

(58) Field of Classification Search
CPC .... A01D 41/14; A01D 41/145; A01D 41/127; A01D 41/12; A01B 63/00
USPC ...... 701/50, 36; 342/386; 56/10.2 R; 17/819
See application file for complete search history.

(56) References Cited

U.S. PATENT DOCUMENTS

| | | | |
|---|---|---|---|
| 12,750 | A | 4/1855 | Chatfield |
| 524,215 | A | 8/1894 | Quigley |
| 2,413,072 | A | 12/1946 | Sage |
| 2,694,894 | A | 11/1954 | Linscheld |
| 3,468,109 | A | 9/1969 | Reimer |
| 3,472,008 | A | 10/1969 | Hurlburt |
| 3,550,366 | A | 12/1970 | Gibson |
| 3,771,299 | A | 11/1973 | Gradwohl et al. |
| 3,927,512 | A | 12/1975 | Molzahn |

(Continued)

FOREIGN PATENT DOCUMENTS

| | | |
|---|---|---|
| CA | 1003310 | 1/1977 |
| CA | 1040438 | 10/1978 |

(Continued)

*Primary Examiner* — Marthe Marc-Coleman

(57) ABSTRACT

A method for conditioning at least one control signal transmitted by a controller is disclosed. The method involves intercepting the control signal and producing at least one output signal for receipt by the positioning system instead of the control signal in response to the control signal. The output signal represents a plurality of active times during which the positioning system is instructed to move the agricultural implement towards the at least one desired position and a plurality of inactive times during which the positioning system is instructed not to move, each active time being followed by a respective one of the plurality of inactive times. Each of the plurality of inactive times is sufficiently long to permit the agricultural implement to settle into a fixed position due to a positioning response time of the positioning system. Other methods, apparatuses, systems, and computer-readable media are also disclosed.

27 Claims, 23 Drawing Sheets

(56) References Cited

U.S. PATENT DOCUMENTS

| | | |
|---|---|---|
| 3,945,180 A | 3/1976 | Sinclair |
| 4,038,810 A | 8/1977 | Williams et al. |
| 4,067,177 A | 1/1978 | Tout |
| 4,120,137 A | 10/1978 | Schoeneberger et al. |
| 4,127,981 A | 12/1978 | Parrish et al. |
| 4,137,696 A | 2/1979 | Webb |
| 4,156,340 A | 5/1979 | Colgan et al. |
| 4,174,602 A | 11/1979 | Webb et al. |
| 4,177,625 A | 12/1979 | Knight et al. |
| 4,187,664 A | 2/1980 | Meek et al. |
| 4,202,154 A | 5/1980 | Waldrop et al. |
| 4,270,338 A | 6/1981 | Halls |
| 4,346,909 A | 8/1982 | Hundeby |
| 4,353,201 A | 10/1982 | Pierce et al. |
| 4,435,948 A | 3/1984 | Jennings |
| 4,512,140 A | 4/1985 | Blakeslee |
| 4,519,190 A | 5/1985 | Blakeslee |
| 4,522,018 A | 6/1985 | Blakeslee |
| 4,541,229 A | 9/1985 | Elijah |
| 4,573,124 A | 2/1986 | Seiferling |
| 4,573,309 A | 3/1986 | Patterson |
| 4,612,757 A | 9/1986 | Halls et al. |
| 4,637,201 A | 1/1987 | Pruitt et al. |
| 4,641,490 A | 2/1987 | Wynn et al. |
| 4,660,361 A | 4/1987 | Remillard et al. |
| 4,662,161 A | 5/1987 | Patterson |
| 4,751,809 A | 6/1988 | Fox et al. |
| 4,776,155 A | 10/1988 | Fox et al. |
| 4,833,869 A | 5/1989 | Klein |
| 4,909,026 A | 3/1990 | Molzahn et al. |
| 4,936,082 A | 6/1990 | Majkrzak |
| 4,944,141 A | 7/1990 | Orlando et al. |
| 4,956,966 A | 9/1990 | Patterson |
| 5,005,343 A | 4/1991 | Patterson |
| 5,007,235 A | 4/1991 | Nickel et al. |
| 5,086,613 A | 2/1992 | Fox et al. |
| 5,155,983 A | 10/1992 | Sheehan et al. |
| 5,157,905 A | 10/1992 | Talbot et al. |
| 5,243,810 A | 9/1993 | Fox et al. |
| 5,261,290 A | 11/1993 | Ramsay et al. |
| 5,359,839 A | 11/1994 | Parsons et al. |
| 5,435,239 A | 7/1995 | Talbot |
| 5,459,986 A | 10/1995 | Talbot et al. |
| 5,473,872 A | 12/1995 | Fox et al. |
| 5,535,577 A | 7/1996 | Chmielewski et al. |
| 5,595,053 A | 1/1997 | Jasper et al. |
| RE35,543 E | 7/1997 | Patterson |
| 5,678,398 A | 10/1997 | Fox et al. |
| 5,681,117 A | 10/1997 | Wellman et al. |
| 5,704,200 A | 1/1998 | Chmielewski, Jr. et al. |
| 5,768,870 A | 6/1998 | Talbot et al. |
| 5,791,128 A | 8/1998 | Rogalsky |
| 5,927,606 A | 7/1999 | Patterson |
| 5,992,759 A | 11/1999 | Patterson |
| 6,029,429 A | 2/2000 | Fox et al. |
| 6,044,636 A | 4/2000 | Minnaert |
| 6,079,194 A | 6/2000 | Waldrop |
| 6,170,244 B1 | 1/2001 | Coers et al. |
| 6,195,972 B1 | 3/2001 | Talbot et al. |
| 6,199,358 B1 | 3/2001 | Majkrzak |
| 6,282,876 B1 | 9/2001 | Patterson |
| 6,324,823 B1 | 12/2001 | Remillard |
| 6,351,931 B1 | 3/2002 | Shearer |
| 6,397,573 B2 | 6/2002 | Majkrzak |
| 6,442,918 B1 | 9/2002 | Fox |
| 6,453,655 B2 | 9/2002 | Ferraris |
| 6,502,379 B1 | 1/2003 | Snider |
| 6,519,923 B1 | 2/2003 | Cooksey et al. |
| 6,530,202 B1 | 3/2003 | Guyer |
| 6,543,211 B1 | 4/2003 | Talbot |
| 6,591,598 B2 | 7/2003 | Remillard et al. |
| 6,675,568 B2 | 1/2004 | Patterson et al. |
| 6,698,175 B1 | 3/2004 | Schumacher et al. |
| 6,708,475 B2 | 3/2004 | Guyer |
| 6,817,166 B2 | 11/2004 | Dunn |
| 6,843,045 B2 | 1/2005 | Bickel |
| 6,854,251 B2 | 2/2005 | Snider |
| 6,865,871 B2 | 3/2005 | Patterson et al. |
| 6,889,492 B1 | 5/2005 | Polk et al. |
| 6,962,040 B2 | 11/2005 | Talbot |
| 7,077,220 B2 | 7/2006 | Dunn et al. |
| 7,131,253 B2 | 11/2006 | Remillard et al. |
| 7,159,687 B2 | 1/2007 | Dunn et al. |
| 7,188,461 B2 | 3/2007 | Fox et al. |
| 7,197,865 B1 | 4/2007 | Enns et al. |
| 7,306,062 B2 | 12/2007 | Dunn |
| 7,306,252 B2 | 12/2007 | Barnett |
| 7,308,947 B2 | 12/2007 | Barnett |
| 7,322,175 B2 | 1/2008 | Ferre et al. |
| 7,328,565 B2 | 2/2008 | Snider et al. |
| 7,340,876 B1 | 3/2008 | Barnett |
| 7,347,277 B2 | 3/2008 | Enns et al. |
| 7,356,982 B2 | 4/2008 | Barnett |
| 7,364,181 B2 | 4/2008 | Patterson |
| 7,373,769 B2 | 5/2008 | Talbot et al. |
| 7,392,124 B2 | 6/2008 | MacGregor et al. |
| 7,392,646 B2 | 7/2008 | Patterson |
| 7,438,305 B2 | 10/2008 | Schulz |
| 7,444,798 B2 | 11/2008 | Patterson et al. |
| 7,454,888 B2 | 11/2008 | Barnett |
| 7,461,498 B1 | 12/2008 | Barnett |
| 7,467,505 B2 | 12/2008 | MacGregor |
| 7,472,533 B2 | 1/2009 | Talbot et al. |
| 7,484,349 B2 | 2/2009 | Talbot et al. |
| 7,497,069 B2 | 3/2009 | Enns et al. |
| 7,647,755 B2 | 1/2010 | Barnett et al. |
| 7,721,830 B2 | 5/2010 | Dunn et al. |
| 7,730,707 B2 | 6/2010 | Pietricola et al. |
| 7,849,952 B2 | 12/2010 | MacGregor et al. |
| 7,856,801 B2 | 12/2010 | Remillard |
| 7,918,076 B2 | 4/2011 | Talbot |
| 7,958,706 B2 | 6/2011 | Remillard et al. |
| 8,006,469 B2 | 8/2011 | Barnett |
| 8,015,784 B2 | 9/2011 | Barnett et al. |
| 8,020,363 B1 | 9/2011 | Barnett et al. |
| 8,020,648 B2 | 9/2011 | Otto |
| 8,056,311 B1 | 11/2011 | Barnett |
| 8,069,640 B2 | 12/2011 | Barnett et al. |
| 8,096,102 B2 | 1/2012 | Smith |
| 8,117,812 B2 | 2/2012 | Patterson |
| 8,161,719 B2 | 4/2012 | Barnett et al. |
| 8,176,716 B2 | 5/2012 | Coers et al. |
| 8,225,589 B2 | 7/2012 | Barnett |
| 8,225,903 B2 | 7/2012 | Dunn |
| 8,240,114 B2 | 8/2012 | Barnett |
| 8,245,489 B2 | 8/2012 | Talbot |
| 8,286,411 B2 | 10/2012 | Barnett et al. |
| 8,286,412 B2 | 10/2012 | Kidd et al. |
| 8,291,684 B2 | 10/2012 | Remillard et al. |
| 8,291,686 B1 | 10/2012 | Cormier et al. |
| 8,307,620 B1 | 11/2012 | Barnett et al. |
| 8,333,057 B2 | 12/2012 | Schroeder et al. |
| 8,341,927 B2 | 1/2013 | Barnett |
| 8,387,351 B2 | 3/2013 | Guyer |
| 8,402,728 B2 | 3/2013 | Kidd |
| 8,408,567 B2 | 4/2013 | Bergman et al. |
| 8,434,290 B2 | 5/2013 | Barnett et al. |
| 8,468,789 B2 | 6/2013 | Barnett et al. |
| 8,484,938 B2 | 7/2013 | Cormier et al. |
| 8,484,939 B1 | 7/2013 | Cormier et al. |
| 8,511,050 B1 | 8/2013 | Cormier et al. |
| 8,590,284 B2 | 11/2013 | Rayfield |
| 2005/0065789 A1* | 3/2005 | Yacoub .......... G10L 15/32 704/231 |
| 2012/0251653 A1 | 10/2012 | Mathy, Jr. et al. |
| 2012/0260870 A1 | 10/2012 | Wahl et al. |
| 2013/0036860 A1 | 2/2013 | Corniani |
| 2014/0001726 A1 | 1/2014 | Statz |

(56) References Cited

U.S. PATENT DOCUMENTS

2014/0033940 A1    2/2014    Simpson et al.
2014/0150601 A1    6/2014    McGrath

FOREIGN PATENT DOCUMENTS

| | | |
|---|---|---|
| CA | 1043577 | 12/1978 |
| CA | 2180627 | 1/1980 |
| CA | 1086508 | 9/1980 |
| CA | 1087402 | 10/1980 |
| CA | 1185438 | 4/1985 |
| CA | 1197694 | 12/1985 |
| CA | 1318135 | 5/1993 |
| CA | 2100204 | 1/1995 |
| CA | 2126909 | 1/1995 |
| CA | 2138939 | 6/1996 |
| CA | 2165735 | 6/1997 |
| CA | 2180625 | 1/1998 |
| CA | 2180626 | 1/1998 |
| CA | 2211363 | 1/1998 |
| CA | 2198672 | 8/1998 |
| CA | 2226200 | 11/1998 |
| CA | 2229152 | 8/1999 |
| CA | 2245213 | 2/2000 |
| CA | 2280681 | 2/2000 |
| CA | 2184278 | 8/2000 |
| CA | 2289164 | 10/2000 |
| CA | 2289171 | 10/2000 |
| CA | 2284432 | 4/2001 |
| CA | 2284436 | 4/2001 |
| CA | 2320379 | 5/2001 |
| CA | 2307176 | 10/2001 |
| CA | 2311019 | 12/2001 |
| CA | 2320524 | 3/2002 |
| CA | 2357825 | 9/2002 |
| CA | 2380557 | 10/2002 |
| CA | 2387898 | 12/2002 |
| CA | 2358883 | 4/2003 |
| CA | 2359598 | 4/2003 |
| CA | 2370891 | 4/2003 |
| CA | 2399234 | 6/2003 |
| CA | 2389513 | 12/2003 |
| CA | 2406416 | 4/2004 |
| CA | 2406419 | 4/2004 |
| CA | 2427755 | 11/2004 |
| CA | 2461790 | 11/2004 |
| CA | 2467595 | 12/2004 |
| CA | 2434981 | 1/2005 |
| CA | 2510883 | 12/2005 |
| CA | 2513037 | 2/2006 |
| CA | 2341283 | 3/2006 |
| CA | 2494395 | 6/2006 |
| CA | 2494034 | 7/2006 |
| CA | 2505431 | 9/2006 |
| CA | 2505458 | 9/2006 |
| CA | 2531189 | 9/2006 |
| CA | 2513605 | 1/2007 |
| CA | 2513614 | 1/2007 |
| CA | 2528731 | 1/2007 |
| CA | 2743336 | 1/2007 |
| CA | 2521187 | 3/2007 |
| CA | 2522387 | 4/2007 |
| CA | 2524151 | 4/2007 |
| CA | 2525904 | 5/2007 |
| CA | 2527797 | 5/2007 |
| CA | 2534200 | 6/2007 |
| CA | 2538020 | 8/2007 |
| CA | 2554689 | 1/2008 |
| CA | 2596403 | 2/2008 |
| CA | 2559217 | 3/2008 |
| CA | 2559353 | 3/2008 |
| CA | 2561463 | 3/2008 |
| CA | 2609744 | 5/2008 |
| CA | 2627320 | 9/2008 |
| CA | 2626486 | 2/2009 |
| CA | 2639032 | 3/2009 |
| CA | 2783567 | 3/2009 |
| CA | 2587107 | 7/2009 |
| CA | 2627053 | 9/2009 |
| CA | 2578907 | 4/2010 |
| CA | 2671880 | 4/2010 |
| CA | 2564777 | 8/2010 |
| CA | 2695689 | 9/2010 |
| CA | 2665580 | 11/2010 |
| CA | 2665589 | 11/2010 |
| CA | 2706704 | 1/2011 |
| CA | 2706705 | 1/2011 |
| CA | 2706706 | 1/2011 |
| CA | 2706707 | 1/2011 |
| CA | 2775891 | 1/2011 |
| CA | 2783670 | 1/2011 |
| CA | 2713636 | 2/2011 |
| CA | 2596627 | 4/2011 |
| CA | 2686017 | 5/2011 |
| CA | 2721118 | 5/2011 |
| CA | 2739632 | 11/2011 |
| CA | 2708744 | 12/2011 |
| CA | 2745105 | 12/2011 |
| CA | 2538489 | 1/2012 |
| CA | 2707624 | 1/2012 |
| CA | 2709336 | 1/2012 |
| CA | 2710676 | 2/2012 |
| CA | 2734475 | 5/2012 |
| CA | 2766611 | 7/2012 |
| CA | 2744070 | 12/2012 |
| CA | 2802894 | 1/2013 |
| CA | 2796109 | 5/2013 |
| CA | 2796120 | 5/2013 |
| CA | 2796131 | 5/2013 |
| CA | 2796134 | 5/2013 |
| CA | 2796177 | 5/2013 |
| CA | 2796165 | 6/2013 |
| CA | 2802958 | 7/2013 |
| CA | 2802963 | 7/2013 |
| CA | 2802972 | 7/2013 |
| CA | 2802975 | 7/2013 |
| CA | 2803470 | 7/2013 |
| CA | 2814924 | 10/2013 |
| CA | 2815395 | 10/2013 |
| CA | 2815408 | 10/2013 |
| CA | 2815421 | 10/2013 |
| CA | 2815427 | 10/2013 |
| EP | 1935226 | 6/2008 |
| WO | 2012/166629 | 12/2012 |

\* cited by examiner

340

Controller Signal Record

342 ~ Lift Valve Field   TRUE
344 ~ Drop Valve Field  FALSE
346 ~        Time       20150228121512345

420

Signal Time Record

422 ~ Active Time  20ms
424 ~ Inactive Time  300ms

Controller Time Length Record

602 — Controller ID 11FF
606 — Base Active Time Length 20ms
608 — Minimum Active Time Length 10ms
610 — Maximum Active Time Length 40ms
612 — Cycle Time Length 320ms

660

Threshold Time Record

662 — Threshold Time 1.5s

820

Sensed Height Record

822 — Left Sensed Height 1.3 inches
826 — Right Sensed Height 2.0 inches

840

Desired Height Record

842 — Left Desired Height 2.0 inches
844 — Right Desired Height 2.0 inches

1140

Position Record

1142~ First Position 1.3 inches
1144~ Second Position 2.0 inches
1146~ Intermediate Position 0.3 inches

Representative Position Record

1182~ First Representative Position 1.1 inches
1184~ Second Representative Position 1.8 inches

Representative Position Record

1202~ First Representative Position 1.3 inches
1204~ Second Representative Position 2.0 inches

FIG. 32

CONTROLLING A POSITIONING SYSTEM FOR AN AGRICULTURAL IMPLEMENT

BACKGROUND

1. Field

This invention relates to positioning systems for agricultural implements and more particularly to conditioning or producing control signals for controlling a positioning system for an agricultural implement and/or producing position signals representing positioning of the agricultural implement.

2. Description of Related Art

An agricultural implement such as a harvesting header on a combine or a spray boom on a power unit may be driven across a field. During use, it may be desirable to control a position of the implement relative to a propulsion unit and thereby control a position of the implement relative to the ground or to crops on the field. Accurate control of the position of the implement may result in higher crop yields for harvesting and improved efficiency in spraying, for example.

Some agricultural control systems may sense a height or separation distance of the implement above the ground and produce control signals for causing a positioning system to move the implement relative to the propulsion unit, based on the sensed height. However, when a positioning system receives a control signal and is directed to move the implement, there may be a response time before the positioning system is able to cause the implement to reach a fixed or generally non-transient position. Some agricultural control systems may not take into account the response time when producing the control signals for controlling the implement position.

Further, agricultural control systems may sense the position of the implement periodically. Some control systems do not sense positioning frequently enough such that the control signals they produce can maintain accurate control of the implement. Accordingly, some agricultural control systems are constantly causing the agricultural implement to overshoot a desired setpoint position which may result in constant "hunting".

Further, some sensing systems may not be configured to sense changes in the ground at an intermediate position on the agricultural implement.

SUMMARY

The disclosure describes a method for conditioning at least one control signal transmitted by a controller and normally received by a positioning system and configured to cause movement of an agricultural implement relative to a frame towards at least one desired position, the positioning system having a positioning response time for causing the agricultural implement to respond to the at least one control signal. The method involves intercepting the at least one control signal and producing at least one output signal for receipt by the positioning system instead of the at least one control signal in response to the at least one control signal, the at least one output signal representing a plurality of active times during which the positioning system is instructed to move the agricultural implement towards the at least one desired position and a plurality of inactive times during which the positioning system is instructed not to move, each active time being followed by a respective one of the plurality of inactive times. Each of the plurality of inactive times is sufficiently long to permit the agricultural implement to settle into a fixed position due to the positioning response time.

The disclosure also describes a method of operating an agricultural implement on an agricultural vehicle. The method involves causing a controller of the agricultural implement to produce at least one control signal for causing a positioning system to move the agricultural implement up or down relative to the ground or to not move the agricultural implement up or down The method also involves executing the above method to intercept the at least one control signal and to produce the at least one output signal and causing the at least one output signal to be provided to the positioning system instead of the at least one control signal produced by the controller. The method also involves causing the positioning system to move the agricultural implement up or down or to stay in a current position, in response to the at least one output signal.

The disclosure also describes an agricultural implement control system for moving an agricultural implement up and down or for holding the agricultural implement at a height above the ground over which an agricultural vehicle is driven. The agricultural implement control system includes a positioning system operably configured to move the agricultural implement up or down or to not move the agricultural implement up or down, in response to at least one control signal, a controller operably configured to produce the at least one control signal, and a conditioner operably configured to execute the above method to intercept the at least one control signal and to produce the at least one output signal and cause the at least one output signal to be provided to the positioning system instead of the at least one control signal produced by the controller.

The disclosure also describes a method for producing at least one control signal for controlling a positioning system, the positioning system having a positioning response time for causing an agricultural implement to move in response to the at least one control signal. The method involves receiving at least one position signal representing at least one position of the agricultural implement and receiving at least one desired position signal representing at least one desired position of the agricultural implement. The method also involves deriving the at least one control signal from at least one difference between the at least one position and the at least one desired position and producing the at least one control signal for receipt by the positioning system, the at least one control signal representing a plurality of active times during which the positioning system is instructed to move the agricultural implement towards the at least one desired position and a plurality of inactive times during which the positioning system is instructed not to move, each active time being followed by a respective one of the plurality of inactive times. Each of the plurality of inactive times is sufficiently long to permit the agricultural implement to settle into a fixed position due to the positioning response time.

The disclosure also describes a method for producing representative position signals for use by a controller for controlling positioning of an agricultural implement relative to a reference surface. The method involves receiving at least one signal representing first, second, and intermediate positions relative to the reference surface of first, second, and intermediate locations respectively of the agricultural implement, the first and second locations being spaced apart and the intermediate location being disposed generally between the first and second locations, and when the intermediate position meets a reference surface proximity criterion, producing at least one modified representative position signal for receipt by the controller, the at least one modified representative position signal representing at least one modified position that differs from the first and second positions.

The disclosure also describes an apparatus for conditioning at least one control signal transmitted by a controller and normally received by a positioning system and configured to cause movement of an agricultural implement relative to a frame towards at least one desired position, the positioning system having a positioning response time for causing the agricultural implement to respond to the at least one control signal. The apparatus includes provisions for intercepting the at least one control signal and provisions for producing at least one output signal for receipt by the positioning system instead of the at least one control signal in response to the at least one control signal, the at least one output signal representing a plurality of active times during which the positioning system is instructed to move the agricultural implement towards the at least one desired position and a plurality of inactive times during which the positioning system is instructed not to move, each active time being followed by a respective one of the plurality of inactive times. Each of the plurality of inactive times is sufficiently long to permit the agricultural implement to settle into a fixed position due to the positioning response time.

The disclosure also describes an apparatus for producing at least one control signal for controlling a positioning system, the positioning system having a positioning response time for causing an agricultural implement to move in response to the at least one control signal. The apparatus includes provisions for receiving at least one position signal representing at least one position of the agricultural implement and provisions for receiving at least one desired position signal representing at least one desired position of the agricultural implement. The apparatus also includes provisions for deriving the at least one control signal from at least one difference between the at least one position and the at least one desired position and provisions for producing the at least one control signal for receipt by the positioning system, the at least one control signal representing a plurality of active times during which the positioning system is instructed to move the agricultural implement towards the at least one desired position and a plurality of inactive times during which the positioning system is instructed not to move, each active time being followed by a respective one of the plurality of inactive times. Each of the plurality of inactive times is sufficiently long to permit the agricultural implement to settle into a fixed position due to the positioning response time.

The disclosure also describes an apparatus for producing representative position signals for use by a controller for controlling positioning of an agricultural implement relative to a reference surface. The apparatus includes provisions for receiving at least one signal representing first, second, and intermediate positions relative to the reference surface of first, second, and intermediate locations respectively of the agricultural implement, the first and second locations being spaced apart and the intermediate location being disposed generally between the first and second locations, and provisions for, when the intermediate position meets a reference surface proximity criterion, producing at least one modified representative position signal for receipt by the controller, the at least one modified representative position signal representing at least one modified position that differs from the first and second positions.

The disclosure also describes an apparatus for conditioning at least one control signal transmitted by a controller and normally received by a positioning system and configured to cause movement of an agricultural implement relative to a frame towards at least one desired position, the positioning system having a positioning response time for causing the agricultural implement to respond to the at least one control signal. The apparatus includes at least one processor configured to intercept the at least one control signal and produce at least one output signal for receipt by the positioning system instead of the at least one control signal in response to the at least one control signal, the at least one output signal representing a plurality of active times during which the positioning system is instructed to move the agricultural implement towards the at least one desired position and a plurality of inactive times during which the positioning system is instructed not to move, each active time being followed by a respective one of the plurality of inactive times. Each of the plurality of inactive times is sufficiently long to permit the agricultural implement to settle into a fixed position due to the positioning response time.

The disclosure also describes an apparatus for producing at least one control signal for controlling a positioning system, the positioning system having a positioning response time for causing an agricultural implement to move in response to the at least one control signal. The apparatus includes at least one processor configured to receive at least one position signal representing at least one position of the agricultural implement and receive at least one desired position signal representing at least one desired position of the agricultural implement. The at least one processor is also configured to derive the at least one control signal from at least one difference between the at least one position and the at least one desired position and produce the at least one control signal for receipt by the positioning system, the at least one control signal representing a plurality of active times during which the positioning system is instructed to move the agricultural implement towards the at least one desired position and a plurality of inactive times during which the positioning system is instructed not to move, each active time being followed by a respective one of the plurality of inactive times. Each of the plurality of inactive times is sufficiently long to permit the agricultural implement to settle into a fixed position due to the positioning response time.

The disclosure also describes an apparatus for producing representative position signals for use by a controller for controlling positioning of an agricultural implement relative to a reference surface. The apparatus includes at least one processor configured to receive at least one signal representing first, second, and intermediate positions relative to the reference surface of first, second, and intermediate locations respectively of the agricultural implement, the first and second locations being spaced apart and the intermediate location being disposed generally between the first and second locations, and when the intermediate position meets a reference surface proximity criterion, produce at least one modified representative position signal for receipt by the controller, the at least one modified representative position signal representing at least one modified position that differs from the first and second positions.

The disclosure also describes a computer-readable medium having stored thereon codes which, when executed by at least one processor, cause the at least one processor to perform any one of the above methods.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 12 is a representation of an exemplary signal time record used by the processor circuit of FIG. 5;

FIG. 30 is a representation of an exemplary position record used by the processor circuit of FIG. 28;

FIG. 31 is a representation of an exemplary representative position record used by the processor circuit of FIG. 28; and FIG. 32 is a representation of an exemplary representative position record used by the processor circuit of FIG. 28.

DETAILED DESCRIPTION

Figure 1:
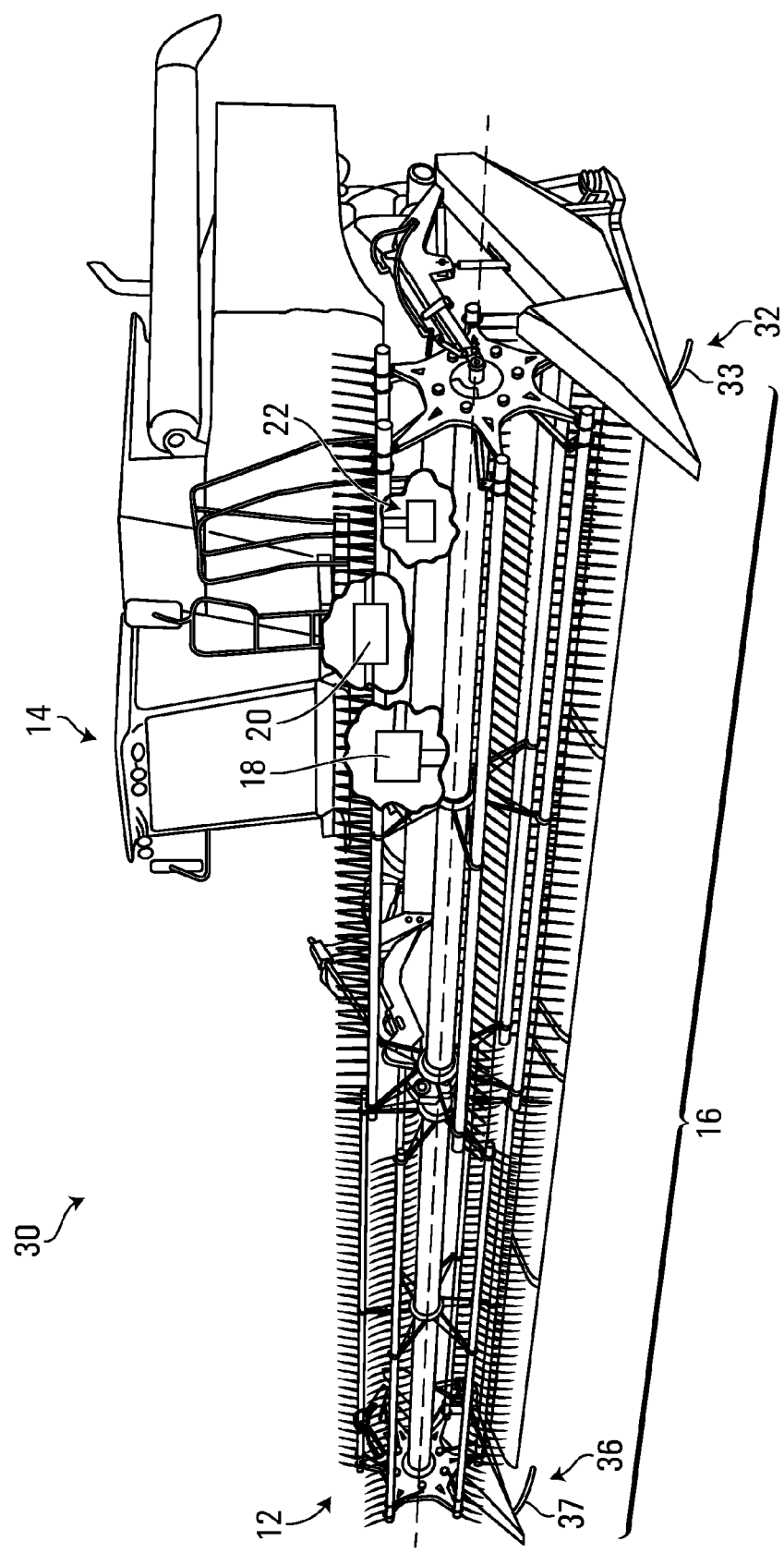
FIG. 1 is a perspective view of an agricultural apparatus including a system for controlling movement of an agricultural implement according to one embodiment of the invention.

Referring to FIG. 1, an agricultural apparatus in accordance with one embodiment is shown at 30. In the embodiment shown, the agricultural apparatus 30 is an agricultural combine harvester including a header 12, which acts as an agricultural implement, mounted to a propulsion and processing unit 14 (hereinafter referred to as a "propulsion unit"), which acts as a frame.

In various embodiments, the header 12 is configured to harvest crop material from crops growing in a field while the apparatus 30 is driven across the field by the propulsion unit 14. The header 12 is configured to collect the crop material and transfer the crop material to the propulsion unit 14 which may be configured to process the crop material.

In various embodiments, the header 12 may be able to efficiently harvest the crop material when the header 12 is kept at a constant height or separation distance close to the ground, without striking the ground. As the apparatus 30 travels over the ground, the ground may have inconsistencies and undulations and therefore in order to keep the header 12 at a constant height relative to the ground, in various embodiments, the apparatus has a sensor system 16 to sense changes in the ground, which may act as a reference surface. The apparatus 30 then controls a position of the header 12 relative to the propulsion unit 14 to maintain the header at a constant or desired height above the reference surface.

Figure 2:
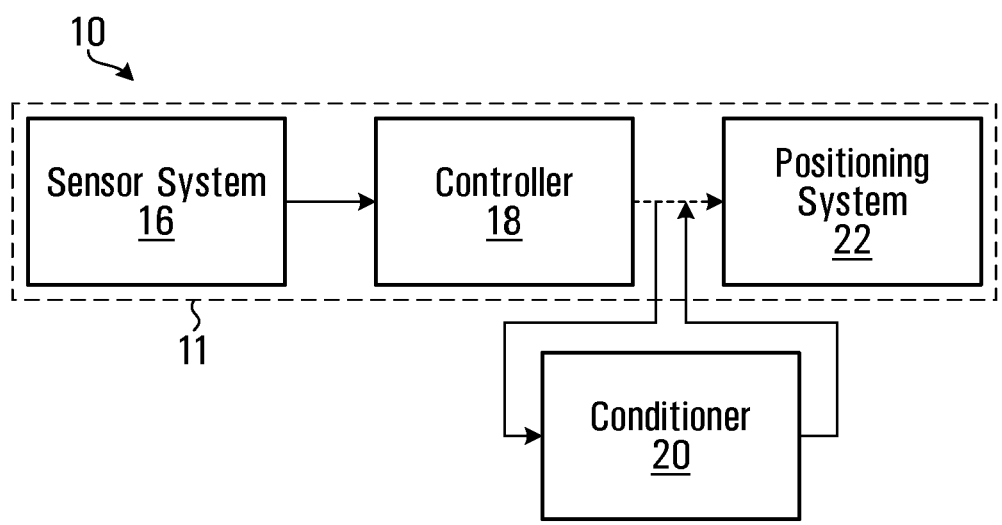
FIG. 2 is a schematic view of the system of FIG. 1 according to one embodiment.

Referring to FIG. 2, to control the position of the header 12, the apparatus 30 shown in FIG. 1 includes a system 10 for controlling movement of the agricultural implement relative to the frame. The system 10 includes a controller system 11 including the sensor system 16, a controller 18, and a positioning system 22. The controller system 11 may be a known controller system such as supplied by a manufacturer of the apparatus for controlling movement of the agricultural implement.

Referring to FIG. 2, the sensor system 16 is configured to sense a position of the agricultural implement and to transmit position signals representing the sensed position to the controller 18. The controller 18 receives the position signals representing the sensed position and compares the sensed position to a desired position to determine a difference. The controller 18 then produces control signals, based on the difference. The controller 18 is configured to transmit the control signals to the positioning system 22 which may control hydraulic actuators, for example to cause movement of the agricultural implement towards a desired position relative to the frame.

The positioning system 22 has a positioning response time for causing the agricultural implement to respond to the control signals. In cases where the positioning system has a positioning response time that results in excessive movement or "hunting" for the desired position, according to the teachings herein the system 10 is provided with a signal conditioner 20, which is configured to condition the control signals transmitted by the controller 18 and normally received by the positioning system 22. The conditioner 20 is configured to intercept the control signals transmitted by the controller 18 and to transmit conditioned control signals or output signals to the positioning system 22 instead of the control signals, in response to the control signals transmitted by the controller 18.

The conditioned control signals may represent a plurality of active times during which the positioning system 22 is instructed to move the agricultural implement towards a desired position and a plurality of inactive times during which the positioning system 22 is instructed not to move, with each active time being followed by a respective one of the inactive times. In some embodiments the conditioner 20 may be configured to cause the inactive times to be sufficiently long to permit the agricultural implement to settle into a fixed position due to the positioning response time of the positioning system 22. In some embodiments, the agricultural implement may be considered to be in a fixed position when the agricultural implement is generally non-transient or when the agricultural implement would not substantially change its general position, given further time. In some embodiments, an oscillating agricultural implement may be considered to have settled into a fixed position.

Referring back to FIG. 1, the system 10 of FIG. 2 is mounted on the apparatus 30. In the embodiment shown, the sensor system 16 includes left, and right sensors 32 and 36 located at first and second locations on left and right ends respectively of the header 12.

Figure 3:
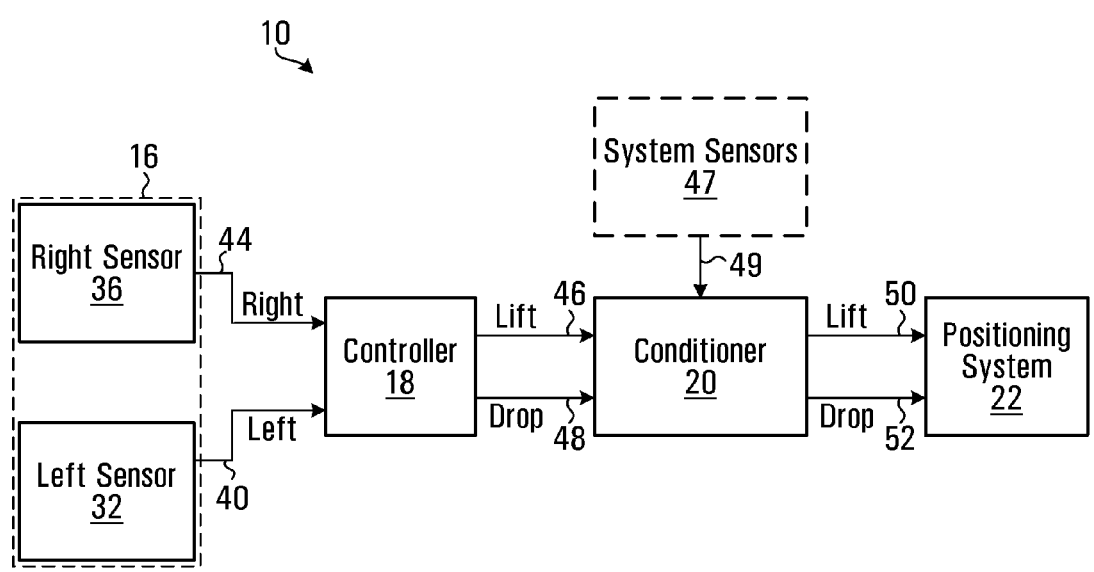
FIG. 3 is a schematic view of the system of FIG. 1 according to one embodiment.

Referring to FIGS. 1 and 3, the sensors 32 and 36 are configured to send left and right position signals 40 and 44 representing left and right sensed positions or heights of respective locations on the header 12 relative to the ground to the controller 18. In some embodiments, the sensors 32 and 36 may each include a sensing arm or paddle (shown at 33 and 37 in FIG. 1) and a Hall Effect sensor configured to sense a rotational angle of the sensing arm.

In various embodiments the left and right position signals 40 and 44 may be electrical signals which have a voltage level representing a sensed position or height measured by their respective sensor. For example, the voltage level of the left and right position signals 40 and 44 may be between a low voltage level and a high voltage level, with a low voltage level representing 0% of a maximum sensed height and high voltage level representing 100% of the maximum sensed height. For example, in some embodiments, the low voltage level may be about 1 Volt and the high voltage level may be about 4 Volts. However, in various other embodiments, the high and low voltage levels of the left and right position signals 40 and 44 may be other voltage levels.

In the embodiment shown, the sensors 32 and 36 have a minimum sensed height of about 0 inches and a maximum sensed height of about 18 inches. However, in various embodiments, the sensors 32 and 36 may sense other ranges of heights.

In various embodiments, the sensors 32 and 36 may transmit the left and right position signals 40 and 44 to the controller 18 using electrical wires, for example, coupled to a respective one of the sensors 32 and 36 at one end and to the controller 18 at another end.

Referring still to FIG. 3, in various embodiments, the controller 18 may be configured to receive or sample the left and right position signals 40 and 44 representing the left and right sensed heights of the header 12. In some embodiments, the controller 18 may be configured to sample the position signals periodically, such as once every about 320 ms, for example. The controller 18 is configured to compare each of the left and right sensed heights with desired left and right heights respectively to determine differences between the sensed heights and the desired heights. In some embodiments, the controller 18 may be configured to receive signals representing the desired left and right heights from memory and/or via an I/O interface of the controller 18, for example. The desired heights may be about 2", for example.

The controller 18 may, based on the differences between the sensed heights and the desired heights, produce lift and drop control signals 46 and 48 for causing the positioning system 22 to move the header 12 towards the desired heights.

For example, in some embodiments, the controller 18 may be configured to determine a left difference between the left sensed height and the left desired height and to determine a right difference between the right sensed height and the right desired height. When at least one of the left and right differences represents a sensed height that is less than a desired height and has an absolute value that is greater than a threshold difference, the controller 18 may produce the lift and drop control signals 46 and 48 such that, if the control signals were transmitted to the positioning system 22, the control signals would cause the positioning system 22 to cause the header 12 to be raised relative to the propulsion unit 14 shown in FIG. 1. If neither of the left and right differences represents a sensed height that is less than a desired height and has an absolute value that is greater than the threshold difference and at least one of the left and right differences represents a sensed height that is greater than a desired height and has an absolute value that is greater than a threshold difference, the controller 18 may produce the lift and drop control signals 46 and 48 such that, if the control signals were transmitted to the positioning system 22, the control signals would cause the positioning system 22 to drop (i.e. lower) the header 12 relative to the propulsion unit 14 shown in FIG. 1. If the left and right differences are both within a threshold range, the controller 18 may produce the lift and drop control signals 46 and 48 to cause the positioning system 22 to not change the height of the header 12 relative to the propulsion unit 14 shown in FIG. 1.

As discussed above, the controller 18 may be configurable to transmit the lift and drop control signals 46 and 48 directly to the positioning system 22 but, in the embodiment shown in FIG. 3, the conditioner 20 is configured to intercept the lift and drop control signals 46 and 48.

Referring to FIG. 3, the conditioner 20 is configured to intercept the lift and drop control signals 46 and 48 produced by the controller 18 and to produce and transmit conditioned lift and drop control or output signals 50 and 52 to the positioning system 22 instead of the control signals. The conditioned lift and drop output signals 50 and 52 represent a plurality of active times during which the positioning system 22 is instructed to move the header 12 shown in FIG. 1 towards the desired position and a plurality of inactive times during which the positioning system 22 is instructed not to move, with each active time being followed by a respective one of the plurality of inactive times. In various embodiments the conditioner 20 may be configured to cause the inactive times to be sufficiently long to permit the header 12 shown in FIG. 1 to settle into a fixed position due to a positioning response time of the positioning system 22.

In various embodiments, by causing each active time to be followed by a respective inactive time wherein the positioning system is allowed to settle into a fixed position, the conditioner 20 may allow the controller 18 to sample the left and right position signals 40 and 44 and thus sense heights during a time when the header 12 is generally non-transient or has reached a fixed position. In various embodiments, this non-transient height sensing may facilitate more accurate height sensing and thus better control of the position of the header 12 than would be provided by simply transmitting the lift and drop control signals directly from the controller to the positioning system.

Referring to FIG. 3, the positioning system 22 is configured to receive the conditioned lift and drop output signals 50 and 52 from the conditioner 20 and to cause hydraulic actuators to move the header 12 shown in FIG. 1 in accordance with the conditioned output signals.

Figure 4:
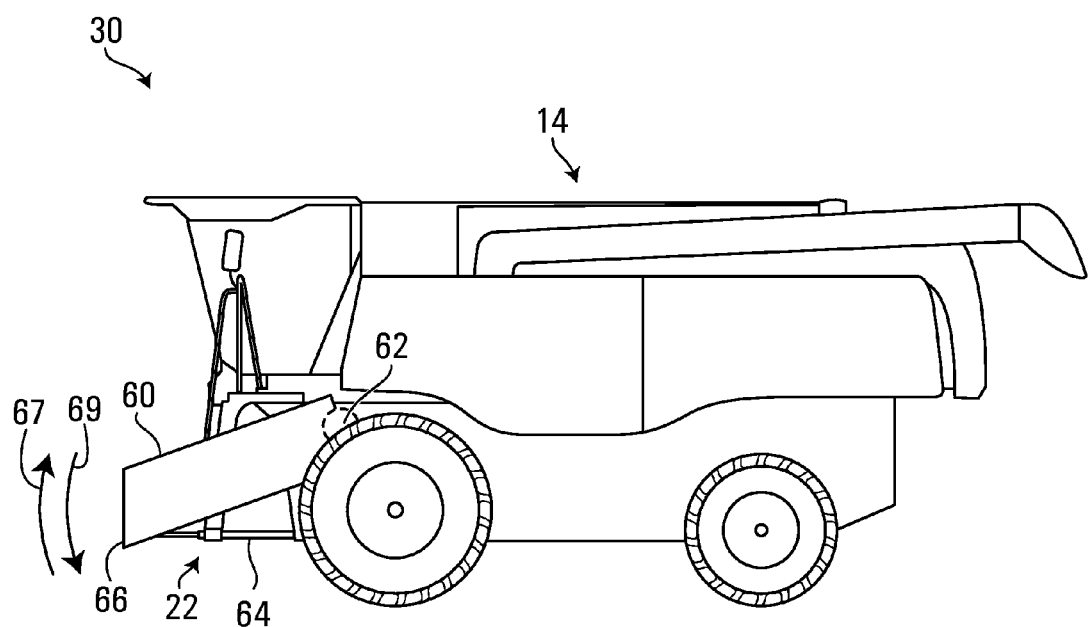
FIG. 4 is a side view of the apparatus of FIG. 1.

FIG. 4 shows a side view of the apparatus 30 without the header 12 attached, showing elements of the positioning system 22, in accordance with one embodiment. Referring to FIG. 4, the positioning system 22 includes a feeder house 60 pivotally connected to the propulsion unit 14 at pivot point 62. The positioning system 22 also includes a height controlling hydraulic system including a height-controlling hydraulic cylinder 64 connected at one end to the feeder house 60 and at the other end to the propulsion unit 14. The height controlling hydraulic system may include a "lift" valve, such as, for example, a solenoid controlled valve which may be controlled using the conditioned lift output signal 50 and a "drop" valve, such as, for example, a solenoid controlled valve, which may be controlled using the conditioned drop output signal 52. When the lift valve is opened and the drop valve is closed, the height-controlling hydraulic cylinder 64 extends. Conversely, when the lift valve is closed and the drop valve is opened, the height-controlling hydraulic cylinder 64 retracts.

The header 12 shown in FIG. 1 is mounted to a front portion 66 of the feeder house 60 shown in FIG. 4. Extension of the height-controlling hydraulic cylinder 64 causes the front portion 66 (and thus the header 12 shown in FIG. 1 when attached to the front portion 66) to move upward relative to the propulsion unit 14 in the direction of arrow 67. Conversely, retraction of the height-controlling hydraulic cylinder 64 may cause the front portion 66 (and thus the header 12 shown in FIG. 1 when attached to the front portion 66) to move downward relative to the propulsion unit 14 in the direction of arrow 69.

As discussed above, in various embodiments, each time the positioning system 22 is instructed to move, there may be a positioning response time before the positioning system 22 finishes moving and reaches a generally non-transient or fixed position. In various embodiments, the positioning response time may be due to a variety of factors such as, for example, weight and momentum of the feeder house 60 and/or the header 12, time required for valves of the height-controlling hydraulic cylinder 64 to open and/or close after being commanded to do so, and/or float in the height-controlling hydraulic cylinder.

Referring back to FIG. 3, in various embodiments, the system 10 may optionally include system sensors 47 for sensing system information and transmitting system information signals 49 representing the system information to the conditioner 20. In some embodiments, the conditioner 20 may be configured to adjust properties of the lift and drop output signals 50 and 52 based on the system information. For example, as will be described in further detail below, in various embodiments, the conditioner 20 may be configured to determine active and inactive time lengths for the lift and drop output signals 50 and 52 based on the system information.

Processor Circuit—Conditioner

Figure 5:
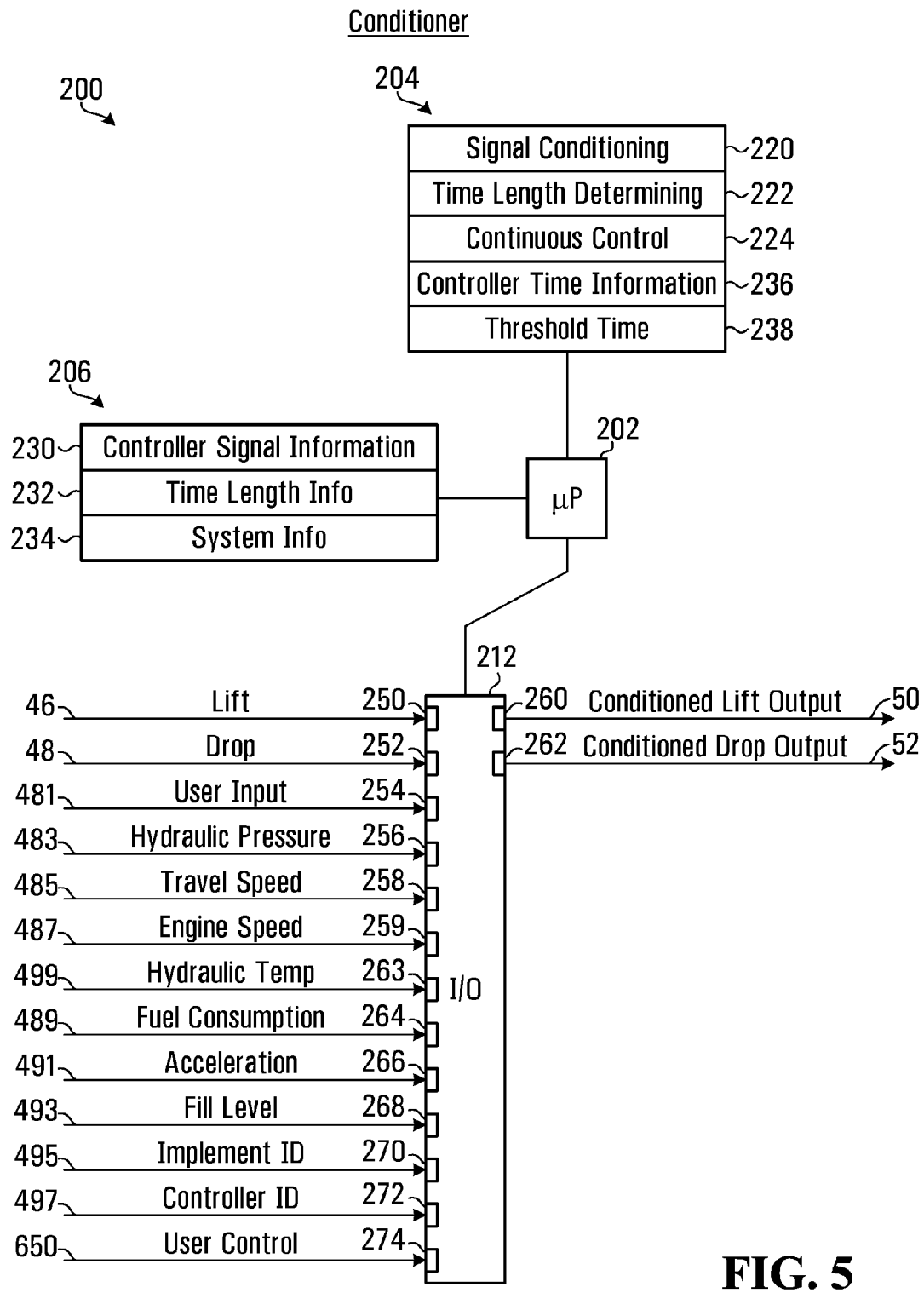
FIG. 5 is a schematic view of a processor circuit for implementing a conditioner included in the system of FIG. 1.

Referring to FIG. 5, a processor circuit for implementing the conditioner 20 shown in FIG. 1 according to one embodiment is shown generally at 200. The processor circuit 200 includes a conditioner processor 202, a program memory 204, a variable memory 206, and an input output ("I/O") interface 212, all of which are in communication with the conditioner processor 202. For example, the conditioner processor 202 may be an ARM™ Cortex™-M3 processor.

Program codes for directing the conditioner processor 202 to carry out various functions are stored in the program memory 204. The program memory 204 may be implemented as any form of computer-readable memory or storage medium, such as, for example, read only memory (ROM), random access memory (RAM), a hard disk drive (HDD), solid state memory, a network drive, flash memory, removable memory, and/or a combination thereof, for example.

In various embodiments, the variable memory 206 may be implemented in RAM, a hard drive, solid state memory, a network drive, flash memory, a memory stick or card, removable memory, any other form of computer-readable memory or storage medium and/or any combination thereof.

In various embodiments, the program memory 204 includes a block of codes 220 for directing the conditioner processor 202 to perform signal conditioning functions a block of codes 222 for directing the conditioner processor 202 to perform time length determining functions, and a block of codes 224 for directing the conditioner processor 202 to perform continuous control functions. The program memory 204 also includes at least one memory location 236 for storing controller time information and at least one memory location 238 for storing threshold time information.

The variable memory 206 may include a plurality of storage locations including locations 230 for storing controller signal information, locations 232 for storing time length information, and locations 234 for storing system information.

The I/O interface 212 includes input ports 250 and 252 for receiving control signals such as, for example, the lift and drop control signals 46 and 48, and output ports 260 and 262 for producing and transmitting the conditioned output signals 50 and 52 to the positioning system. In the embodiment shown, the I/O interface also includes input ports 254, 256, 258, 259, 263, 264, 266, 268, 270, 272, and 274 for receiving user input signals, pressure signals, travel speed signals, engine speed signals, temperature signals, fuel consumption signals, acceleration signals, fill level signals, implement identifier signals, controller identifier signals, and user control signals, respectively. In various embodiments, the I/O interface 212 may include an analog to digital converter in communication with the input ports and a digital to analog converter in communication with the output ports, for example.

Each of the input ports and output ports shown in FIG. 5 are shown as single ports which are distinct and separate. However, in various embodiments, one or more of the input and output ports may be implemented using one or more ports.

Figure 6A:
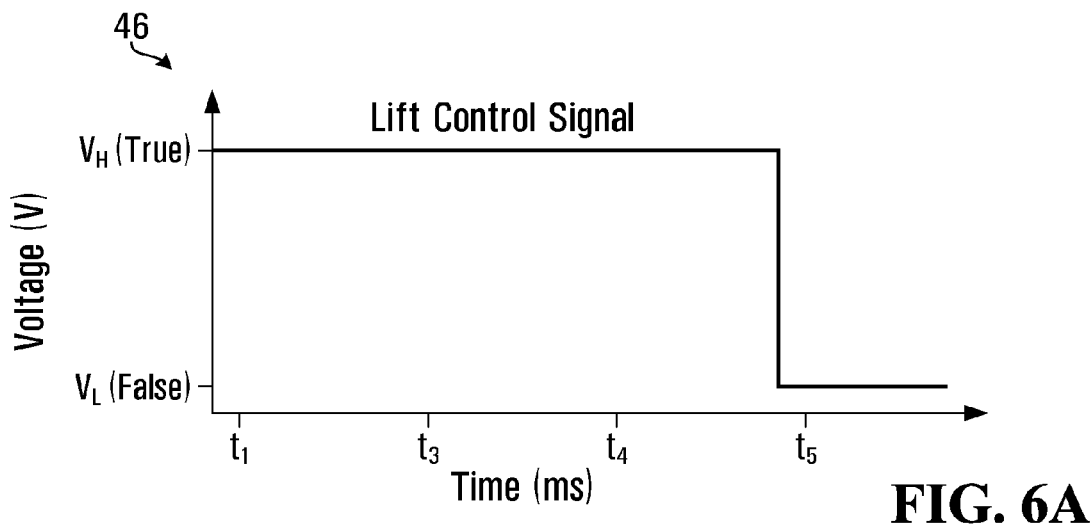
FIG. 6A is a representation of an exemplary portion of a lift control signal.
Figure 6B:
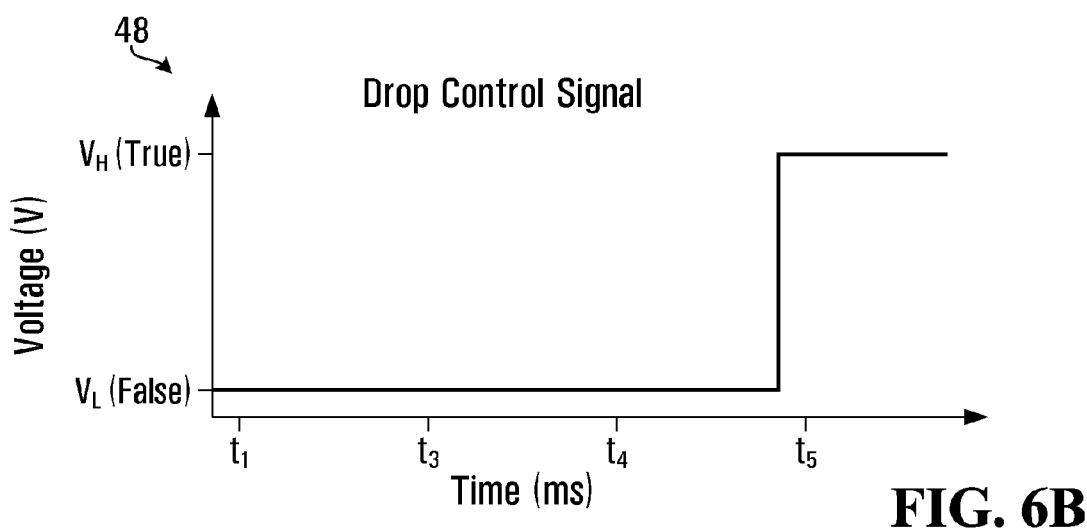
FIG. 6B is a representation of an exemplary portion of a drop control signal.

Referring to FIGS. 6A and 6B exemplary representations of the lift and drop control signals 46 and 48 during a time period, in accordance with one embodiment, are shown. The lift control signal 46 affects control of the lift valve of the height hydraulic system and the drop control signal 48 affects control of the drop valve of the height hydraulic system.

In various embodiments, a high voltage level of $V_H$ on the lift control signal 46 shown in FIG. 6A, if communicated to the lift valve of the height hydraulic system shown in FIG. 4 may cause the lift valve to open and a low voltage level of $V_L$, if communicated to the lift valve of the height hydraulic system may cause the lift valve to close. Similarly, a low voltage level of $V_L$ on the drop control signal 48 shown in FIG. 6B, if communicated to the drop valve of the height hydraulic system may cause the drop valve to close and a high voltage level of $V_H$ if communicated to the drop valve of the height hydraulic system may cause the drop valve to open. The voltage levels $V_H$ and $V_L$ may vary depending on a type of the controller 18 shown in FIG. 3. For example, in some embodiments, for some controllers, the high voltage level of $V_H$ may be about 12 volts and the low voltage level $V_L$ may be about 0 volts.

In various embodiments, the lift and drop control signals 46 and 48, which are represented in accordance with one embodiment in FIGS. 6A and 6B, and shown in context in FIG. 3, may fall within one of three control states at a given time. In an up control state, the lift control signal 46 has a high voltage level of $V_H$ and the drop control signal 48 has a low voltage level of $V_L$. When the lift and drop control signals 46 and 48 are in the up control state, the lift and drop control signals 46 and 48, if communicated to the positioning system 22, cause the lift valve to open and the drop valve to close such that the height-controlling hydraulic cylinder 64 shown in FIG. 4 extends and thus raises the header 12 shown in FIG. 1.

In a down control state, the lift control signal 46 has a low voltage level of $V_L$ and the drop control signal 48 has a high voltage level of $V_H$. When the lift and drop control signals 46 and 48 are in the down control state, the lift and drop control signals 46 and 48, if communicated to the positioning system 22, cause the lift valve to close and the drop valve to open such that the hydraulic cylinder 64 shown in FIG. 4 retracts and thus lowers the header 12 shown in FIG. 1.

In an off control state both of the lift and drop control signals 46 and 48 have a low voltage level of $V_L$. Accordingly, when the lift and drop control signals 46 and 48 are in the off control state, the lift and drop control signals 46 and 48, if communicated to the positioning system 22, cause both the lift valve and the drop valve to close such that the hydraulic cylinder 64 shown in FIG. 4 does not move and the positioning system 22 holds the header 12 shown in FIG. 1 at a constant height relative to the propulsion unit.

Signal Conditioning

Figure 7:
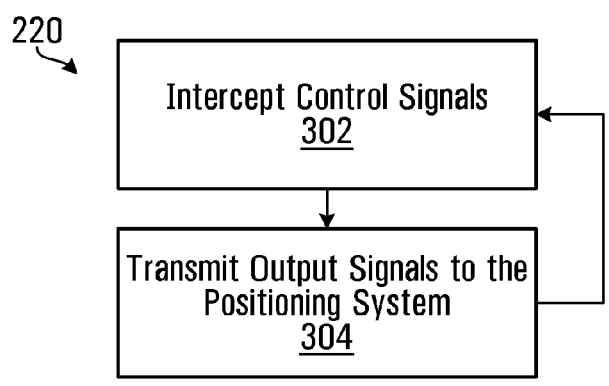
FIG. 7 is a flowchart depicting blocks of code for directing the conditioner shown in FIG. 5 to facilitate signal conditioning.

Referring to FIG. 5, the signal conditioning block of codes 220 of the processor circuit 200 are shown in greater detail in FIG. 7, and include a first block 302 which directs the conditioner processor 202 shown in FIG. 5 to intercept control signals by causing the I/O interface 212 to receive the lift and drop control signals 46 and 48 via the input ports 250 and 252 shown in FIG. 5. Block 302 is shown in greater detail in FIG. 8 wherein it is seen that block 302 includes block 322 which directs the conditioner processor 202 to sample the lift and drop control signals 46 and 48 at the input ports 250 and 252 of the I/O interface 212 shown in FIG. 5. For example, block 322 of FIG. 8 may be executed at time $t_1$ shown in FIGS. 6A and 6B and block 322 may direct the conditioner processor 202 to cause the I/O interface 212 shown in FIG. 5 to sample the lift and drop control signals 46 and 48 at time $t_1$ such that the sampled voltage levels of the lift and drop control signals 46 and 48 are $V_H$ and $V_L$ respectively.

Referring back to FIG. 8, block 324 then directs the conditioner processor 202 shown in FIG. 5 to store controller signal information representing the lift and drop control signals 46 and 48 in memory. In one embodiment, block 324 may direct the conditioner processor 202 to store the controller signal information in a controller signal record representing the lift and drop control signals 46 and 48 in locations 230 of the variable memory 206 shown in FIG. 5.

Figures 8, 9:
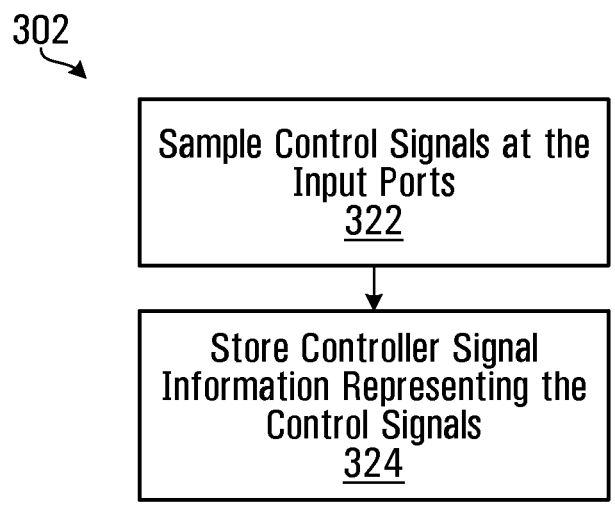
FIG. 8 is a flowchart depicting sub-blocks of code included in the blocks of code shown in FIG. 7.
FIG. 9 is a representation of an exemplary controller signal record used by the processor circuit of FIG. 5.

A representation of an exemplary controller signal record is shown at 340 in FIG. 9. The controller signal record 340 includes a lift valve field 342 and a drop valve field 344 for storing respective Boolean representations of the lift and drop control signals 46 and 48 which were sampled at input ports 250 and 252 respectively of the I/O interface 212 shown in FIG. 5 at time $t_1$. The controller signal record 340 shown in FIG. 9 also includes a time field 346 for storing a representation of the time at which the lift and drop control signals 46 and 48 were sampled.

In various embodiments, the time field 346 shown in FIG. 9 may store a representation of time that may be established by a real time clock or be relative based on a microprocessor clock rate and a cycle count. In various embodiments, the units of measure for the representation of time may be accurate to between microseconds and milliseconds. In the embodiment shown in FIG. 9, the time field 346 stores a value having a format of YYYYMMDDHHMiMiSSTTT, where YYYY represents the year, MM represents the month, DD represents the day of the month, HH represents the hour, MiMi represents the minute, SS represents the second, and TTT represents the thousandths of a second. In some embodiments, the time field 346 may store other representations of time which may, for example, include less information than is shown in FIG. 9. For example, in various embodiments, the time field 346 may not include representations of the year, month, day, hour, or minute.

In various embodiments, block 324 of FIG. 8 may direct the conditioner processor 202 shown in FIG. 5 to store a value of TRUE in the lift valve field 342 of FIG. 9 when the lift control signal 46 received at the input port 250 shown in FIG. 5 represents a voltage of $V_H$ and to store a value of FALSE in the lift valve field 342 when the lift control signal represents a voltage of $V_L$. Similarly, block 324 may direct the conditioner processor 202 to store a value of TRUE in the drop valve field 344 when the drop control signal 48 received at the input port 252 represents a voltage of $V_H$ and to store a value of FALSE in the drop valve field 344 when the drop control signal represents a voltage of $V_L$.

For example when block 322 of FIG. 8 is executed at time $t_1$ shown in FIG. 6A, the lift control signal 46 sampled at the input port 250 shown in FIG. 5 has a voltage of $V_H$ and the drop control signal 48 received at the input port 252 has a voltage of $V_L$. Accordingly, block 324 may direct the conditioner processor 202 to store a value of TRUE in the lift valve field 342 and a value of FALSE in the drop valve field 344, as shown in FIG. 9. In various embodiments, block 324 may direct the conditioner processor 202 to store the controller signal record 340 shown in FIG. 9 in locations 230 of the variable memory 206 shown in FIG. 5.

Figure 11A:
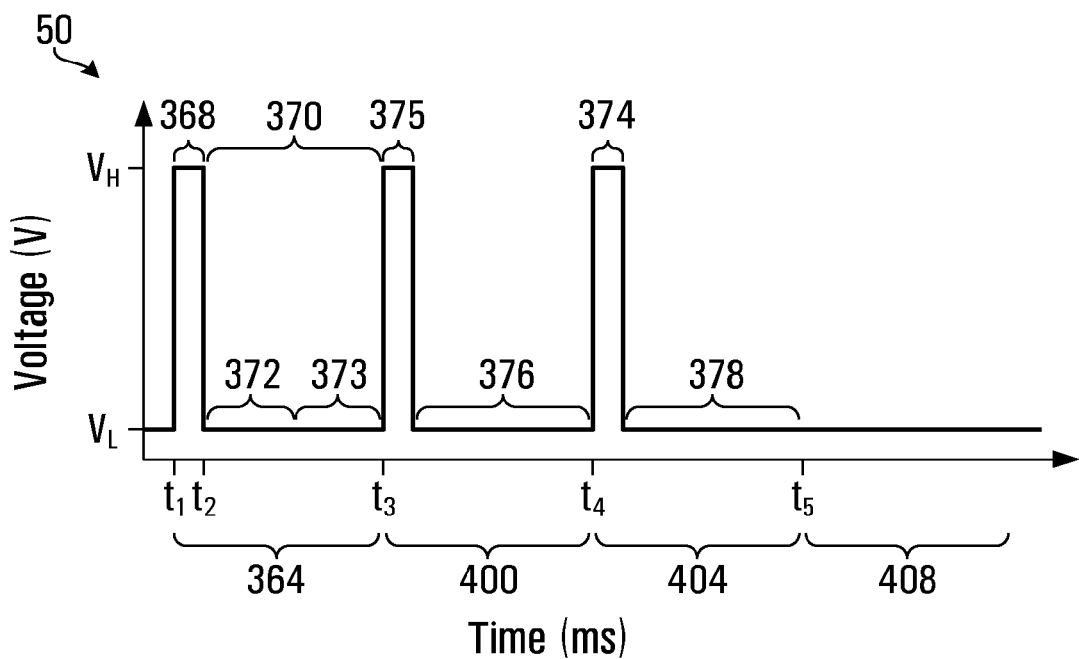
FIG. 11A is a representation of an exemplary portion of a conditioned lift control signal.
Figure 11B:
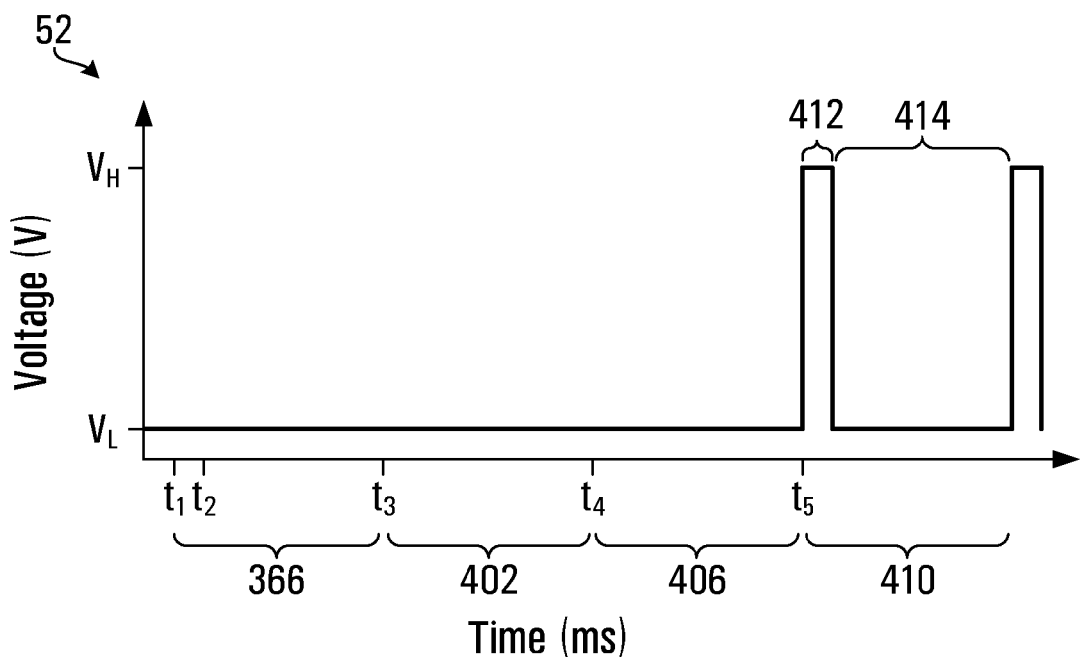
FIG. 11B is a representation of an exemplary portion of a conditioned drop control signal.

Referring back to FIG. 7, after block 302 has been executed, block 304, directs the conditioner processor 202 shown in FIG. 5 to cause the I/O interface 212 shown in FIG. 5 to produce and transmit at least one conditioned output signal, in this embodiment two conditioned output signals (such as shown in FIGS. 11A and 11B), to the positioning system 22 shown in FIG. 3 instead of the lift and drop control signals, wherein the conditioned output signals represent an active time (e.g. 368) during which the positioning system 22 is instructed to move the header 12 shown in FIG. 1 towards a desired position and an inactive time (e.g. 370) following the active time during which the positioning system 22 is instructed not to move, wherein the inactive time (e.g. 370) is sufficiently long to permit the header 12 to settle into a fixed position due to the positioning response time of the positioning system 22.

In various embodiments, the length of the active time (e.g. 368) and the inactive time (e.g. 370) enables the controller 18 to sample the left and right position signals 40 and 44 and update the control signals 46 and 48 when the header 12 has reached a fixed position. Once block 304 is complete, the conditioner processor 202 is directed back to block 302. FIG. 7 thus depicts an endless loop with timings based on known controller 18 and/or positioning system 22 performance, as described in further detail below.

Figure 10:
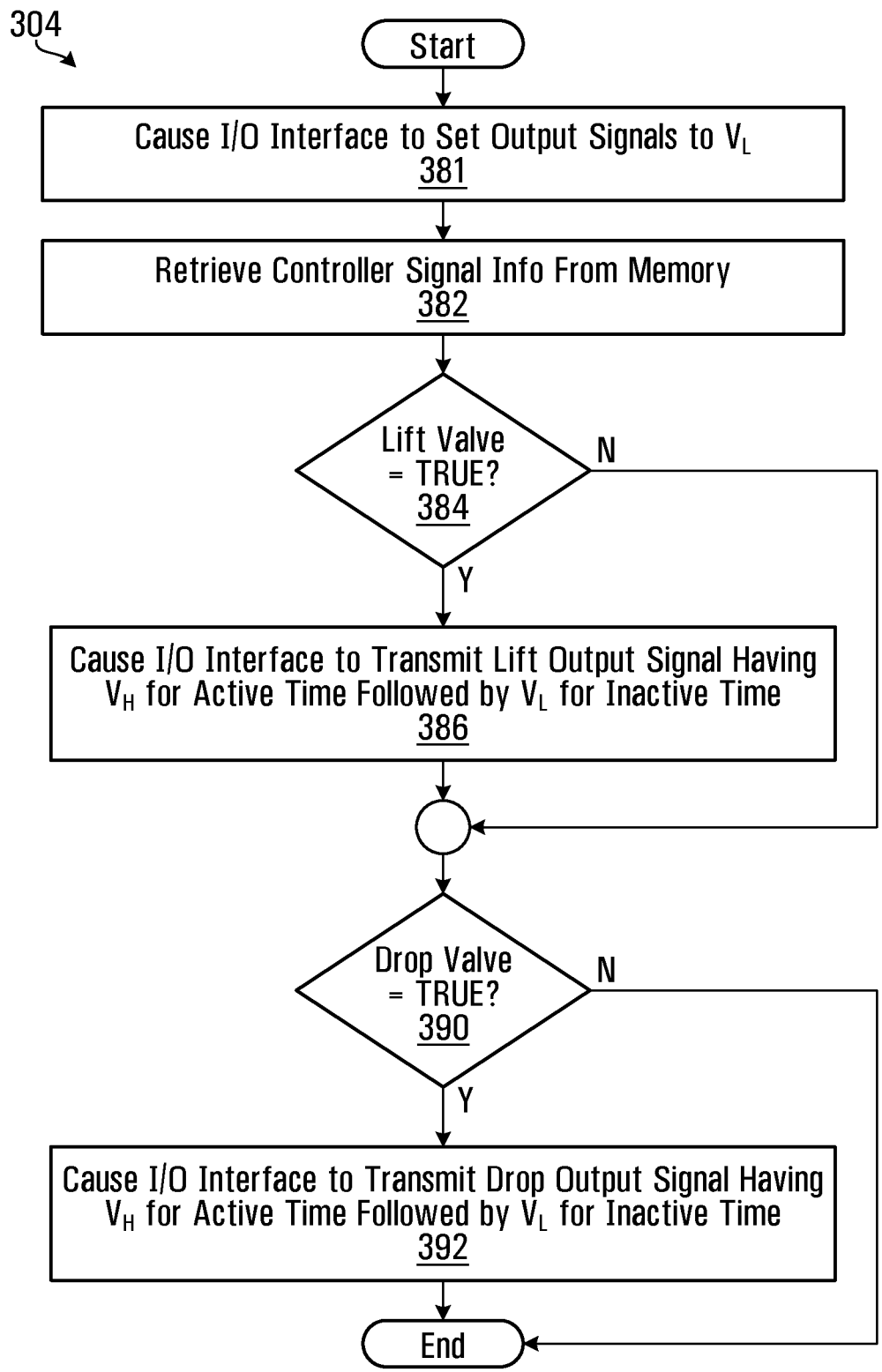
FIG. 10 is a flowchart depicting sub-blocks of code included in the blocks of code shown in FIG. 7

Referring to FIG. 10, block 304 includes blocks of code beginning with block 381 which directs the conditioner processor 202 to cause the I/O interface 212 shown in FIG. 5 to set the lift and drop output signals 50 and 52 at the output ports 260 and 262 to a voltage of $V_L$.

Block 382 of FIG. 10 then directs the conditioner processor 202 shown in FIG. 5 to retrieve controller signal information from locations 230 of the variable memory 206. In the embodiment shown, block 382 directs the conditioner processor 202 to retrieve the most recently stored controller signal record 340 as shown in FIG. 9, from locations 230 of the variable memory 206 shown in FIG. 5.

Block 384 of FIG. 10 then directs the conditioner processor 202 shown in FIG. 5 to determine whether the contents of the lift valve field 342 of the controller signal record 340 retrieved at block 382 are set to TRUE. If at block 384, the conditioner processor 202 determines that the contents of the lift valve field are set to TRUE, block 384 directs the conditioner processor 202 to block 386. If the conditioner processor 202 determines that the contents of the lift valve field are not set to TRUE, block 384 directs the conditioner processor 202 to block 390.

When block 386 of FIG. 10 is executed, block 386 directs the conditioner processor 202 to cause the output port 260 of the I/O interface 212 shown in FIG. 5 to produce a lift output signal having a voltage of $V_H$ for the active time 368 as shown in FIG. 11A and a voltage of $V_L$ for the inactive time 370. A first lift signal portion 364 of the lift output signal 50 is thus transmitted to the positioning system 22 shown in FIG. 3.

In the embodiment shown, a signal time record 420 as shown in FIG. 12 is stored in locations 234 of the variable memory 206 shown in FIG. 5. The signal time record 420 includes an active time length field 422 for storing a representation of an active time length and an inactive time length field 424 for storing a representation of an inactive time length. In some embodiments, the signal time record 420 may be initialized by a manufacturer of the conditioner 20, for example. In some embodiments, as described in further detail below, the signal time record 420 may be derived from system information.

Referring back to FIG. 10, block 386 directs the conditioner processor 202 to read the active time length field 422 of the signal time record 420 shown in FIG. 12 and to cause the I/O interface 212 shown in FIG. 5 to cause the output port 260 to produce a low level voltage $V_H$ for an active time having a length corresponding to the contents of the active time length field. Block 386 similarly directs the conditioner processor 202 to read the inactive time length field 424 of the signal time record 420 and cause the I/O interface 212 to cause the output port 260 to produce a low level voltage $V_L$ for an inactive time having a length corresponding to the contents of the inactive time length field.

Referring to FIG. 11A, in the embodiment shown, block 386 has directed the conditioner processor 202 to cause the conditioned lift output signal to have the first lift signal portion 364 having the active time 368 having a voltage of $V_H$ and a length of 20 ms, corresponding to the value stored in the active time length field 422 of the signal time record 420 shown in FIG. 12. In some embodiments, the active time 368 has a length between 10 ms and 40 ms. Block 386 has also directed the conditioner processor 202 to cause the first lift signal portion 364 to have the inactive time 370 having a voltage of $V_L$ and a length of 300 ms, corresponding to the value stored in the inactive time length field 424 of the signal time record 420 shown in FIG. 12. In some embodiments, the inactive time 370 has a length between 280 ms and 310 ms.

The conditioned drop output signal 52 shown in FIG. 11B remains unchanged during the active and inactive times 368 and 370 of the first lift signal portion 364 and thus the drop output signal 52 includes a first drop signal portion 366 having a voltage of $V_L$, as was set at block 381 of FIG. 10.

If at block 384 of FIG. 10, the conditioner processor 202 shown in FIG. 5 determines that the lift valve field is not set to TRUE, or, upon completion of block 386, the conditioner processor 202 is directed to block 390.

Block 390 directs the conditioner processor 202 shown in FIG. 5 to determine whether a drop valve field of the controller signal record retrieved at block 382 is set to TRUE. If so, the conditioner processor 202 is directed to block 392. If at block 390, the conditioner processor 202 determines that the drop valve field is not set to TRUE, i.e. is set to FALSE, block 390 directs the conditioner processor 202 to end the process.

Block 392 of FIG. 10 is generally similar to block 386, except that block 392 directs the conditioner processor 202 to cause the output port 262 of the I/O interface 212 shown in FIG. 5 to produce the conditioned drop output signal.

When the positioning system 22 shown in FIG. 3 receives the conditioned lift and drop output signals 50 and 52 shown in FIGS. 11A and 11B during the active time 368, the output signals are in an up control state and so the positioning system 22 is instructed to open the lift valve and close the drop valve of the height hydraulic system shown in FIG. 4 and thus raise the header 12 shown in FIG. 1.

Referring to FIG. 11A, at time $t_2$, the conditioner processor 202 causes the output 260 to cause the lift output signal 50 to transition from $V_H$ to $V_L$ and thus the positioning system 22 shown in FIG. 4 is instructed to close the lift valve. Closing of the lift valve may not occur instantaneously after the conditioned lift output signal changes at time $t_2$ due to its response time and even after the lift valve is closed, the header 12 shown in FIG. 1 may continue to move, due to various factors, such as, for example, momentum and/or float in the height hydraulic system shown in FIG. 4. Accordingly, the header 12 shown in FIG. 1 may continue to move during a positioning response time 372 shown in FIG. 11A at the beginning of the inactive time 370 until the header 12 settles into a fixed position.

The inactive time length field 424 should be set to represent a time length that is greater than the positioning response time 372, such that block 386 directs the conditioner processor 202 to cause the conditioned lift output signal 50 to have an inactive time having a sufficient length to include a stable time 373 during which the header 12 has settled into a fixed position. The length of the active time may be sufficiently short and the length of the inactive time may be sufficiently long and suitable delays can be provided by codes in blocks 302 or 304 to facilitate the controller 18 sampling the left and right position signals 40 and 44 and during the stable time 373.

For example, after block 304 of FIG. 7 has been executed and the first lift and drop signal portions 364 and 366 as shown in FIGS. 11A and 11B have been produced, the codes of block 304 may cause the conditioner processor 202 to execute at time $t_3$, for example, block 302 which directs the conditioner processor 202 to sample the lift and drop signals and store a controller signal record having a lift valve field set to TRUE and a drop valve field set to FALSE in accordance with the lift and drop signals as seen at $t_3$ in FIGS. 6A and 6B.

As shown in FIG. 10 block 304 then directs the conditioner processor 202 to cause the outputs 260 and 262 of the I/O interface 212 to produce a second lift signal portion 400 and a second drop signal portion 402 shown in FIGS. 11A and 11B on the output ports 260 and 262 respectively. Referring to FIG. 11A, the second lift signal portion 400 includes an active time 375 and an inactive time 376.

Blocks 302 and 304 of FIG. 7 are then executed again, this time at time $t_4$ shown in FIGS. 6A, 6B, 11A and 11B. Blocks 302 and 304 direct the conditioner processor 202 to cause the outputs 260 and 262 of the I/O interface 212 to produce a third lift signal portion 404 as shown in FIG. 11A and a third drop signal portion 406 as shown in FIG. 11B. Referring to FIG. 11A, the third lift signal portion 404 includes an active time 374 and an inactive time 378.

Blocks 302 and 304 of FIG. 7 are then executed at time $t_5$ shown in FIGS. 6A, 6B, 11A and 11B and at this time ($t_5$), the controller 18 shown in FIG. 3 has determined that a representative sensed height is greater than a desired representative height and so the controller 18 has set the lift and drop control signals 46 and 48 into a drop control state by setting the lift and drop control signals 46 and 48 to $V_L$ and $V_H$ respectively, as shown in FIGS. 6A and 6B.

Therefore, when the conditioner processor 202 executes block 324 of FIG. 8, at time $t_5$, the conditioner processor 202 stores a controller signal record having a lift valve field set to FALSE and a drop valve field set to TRUE.

Referring to FIG. 10, block 384 directs the conditioner processor 202 to block 390, which directs the conditioner processor 202 to block 392. Block 392 directs the conditioner processor 202 to cause the output 262 of the I/O interface 212 to produce a fourth drop signal portion 410 having an active time 412 and inactive time 414 respectively, while the output port 260 transmits a fourth lift signal portion 408.

Referring to FIGS. 11A and 11B, during the active time 412, the output signals 50 and 52 are in a drop control state and the positioning system 22 is instructed to open the drop valve of the height hydraulic system to retract the cylinder, causing the header 12 shown in FIG. 1 to be lowered. In various embodiments, the inactive time 414 may be greater than a positioning response time of the positioning system 22. The active time 412 and the inactive time 414 shown in FIGS. 11A and 11B should be set to sufficient lengths to facilitate the controller 18 sampling the left and right position signals 40 and 44 shown in FIG. 3 and updating the control signals 46 and 48 during a stable time.

In effect blocks 302 and 304 of FIG. 7 are executed in a continuous loop such that the conditioner processor 202 shown in FIG. 5 effectively intercepts the lift and drop control signals 46 and 48 produced by the controller 18 and produces the lift and drop output signals 50 and 52.

More particularly, blocks 302 and 304 of FIG. 7, when executed a plurality of times during the time period shown in FIGS. 11A and 11B, direct the conditioner processor 202 to produce the lift and drop output signals 50 and 52 shown in FIGS. 11A and 11B representing a plurality of active times including the active times 368, 375, 374, and 412 during which the positioning system 22 shown in FIG. 4 is instructed to move and a plurality of inactive times including the inactive times 370, 376, 378, and 414 during which the positioning system 22 shown in FIG. 4 is instructed not to move, each active time 368, 375, 374, and 412 being followed by a respective one of the plurality of inactive times 370, 376, 378, and 414, wherein each of the plurality of inactive times 370, 376, 378, and 414 is sufficiently long to permit the header 12 shown in FIG. 1 to settle into a fixed position due to the positioning response time of the positioning system 22.

Blocks 302 and 304 thus direct the conditioner processor 202 to condition the lift and drop control signals 46 and 48 transmitted by the controller 18, normally received by the positioning system 22, and configured to cause movement of the header 12 relative to a frame towards a desired position, by producing the conditioned lift and drop signals.

Time Length Determining

In various embodiments, the conditioner 20 shown in FIG. 3 may be configured to improve performance of the system 10 by determining, based on system information, lengths for the active times and the inactive times to be represented by the output signals. For example, in various embodiments, the conditioner 20 shown in FIGS. 1-3 and 5 may be configured to receive system information from the system sensors 47 via the system information signals 49 and to determine the lengths of the active times and/or inactive times based on the received system information.

Figure 13:
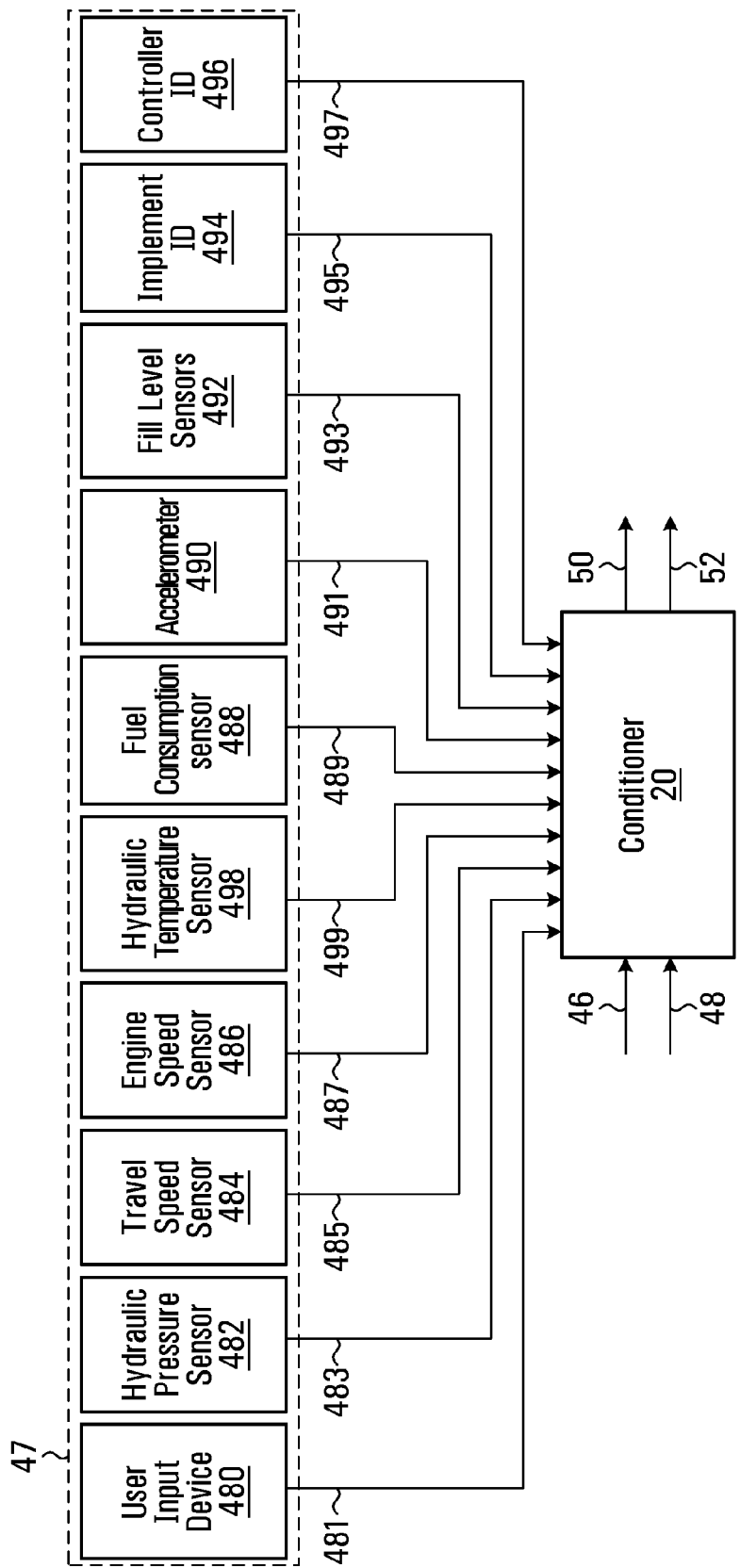
FIG. 13 is a schematic view of portion of the system of FIG. 1 according to one embodiment.

Referring to FIG. 13, in the embodiment shown, the system sensors 47 include a user input device 480 for receiving user input, a hydraulic pressure sensor 482, such as a hydraulic pressure sensor on a combine main pump output, for sensing pressure in a reservoir configured to control the height hydraulic cylinder 64 shown in FIG. 4, a travel speed sensor 484, such as a GPS true ground speed sensor, for sensing a travel speed of the apparatus 30 shown in FIG. 1, an engine speed sensor 486, such as an engine RPM sensor, for sensing an engine speed for an engine that provides power to the positioning system 22 shown in FIG. 4, a hydraulic temperature sensor 498, such as a hydraulic temperature sensor at the reservoir configured to control the height hydraulic cylinder 64, for sensing a temperature of the hydraulic fluid contained in the reservoir, a fuel consumption sensor 488, such as an engine fuel flow meter, for sensing a rate at which the engine that provides power to the positioning system 22 is consuming fuel, an accelerometer 490, such as a vertical accelerometer on the header 12 shown in FIG. 1, for sensing acceleration of the header 12, fill level sensors 492, such as a hopper fill level sensor on the propulsion unit 14 shown in FIG. 1, for sensing a fill level of the propulsion unit 14, an implement identifier device 494 for identifying the header 12 shown in FIG. 1, and a controller identifier device 496 for identifying the controller 18 shown in FIG. 3.

Referring still to FIG. 13, in various embodiments, the user input device 480 is configured to transmit a user input signal 481 representing received user input to the conditioner 20.

In some embodiments, a user may wish to modify system performance or speed with which the system 10 shown in FIG. 3 responds to changes in the sensed environment. The user may use the user input device 480 shown in FIG. 13 to produce the user input signal 481 representing a user-defined speed with which the user wishes the system 10 to respond to changes in the sensed environment. For example, the active time lengths may be altered by the user input. The user input device 480 may include a speed control switch for example or jumper wire on a circuit board on which the conditioner processor 202 is mounted, for example for varying a voltage of the user input signal 481 between a high voltage and a low voltage where a high voltage may indicate that the user wishes that the system 10 shown in FIG. 3 respond quickly using longer active times where a low voltage may indicate that the user wishes that the system respond more slowly using shorter active times.

In other embodiments, the user input device 480 shown in FIG. 13 may include push buttons on a user display unit and the user-defined speed may be represented by a value, such as, for example a value between 0 and 100.

The hydraulic pressure sensor 482 is configured to transmit a pressure signal 483 representing the sensed pressure to the conditioner 20. In various embodiments, the pressure signal 483 represents pressure between about 100 and 5000 PSI. The travel speed sensor 484 is configured to transmit a travel speed signal 485 representing the sensed travel speed to the conditioner 20. In various embodiments, the travel speed signal 485 represents speed between about 0 km/h and 30 km/h. The engine speed sensor 486 is configured to transmit an engine speed signal 487 representing the sensed engine speed to the conditioner 20. In various embodiments, the engine speed signal 487 represents engine speed between about 500 and 4000 RPM.

The hydraulic temperature sensor 498 is configured to transmit a temperature signal 499 representing the sensed temperature to the conditioner 20. The hydraulic temperature sensor 498 may be located in a position on the apparatus 30 shown in FIG. 1 that facilitates accurate sensing of a working temperature of the hydraulic fluid. For example, the hydraulic temperature sensor maybe located at a valve of the hydraulic height cylinder 64 shown in FIG. 4. In various embodiments, the temperature signal 499 represents temperature between about 0 and 200 Celsius.

The fuel consumption sensor 488 is configured to transmit a fuel consumption signal 489 representing the sensed fuel consumption rate to the conditioner 20. In various embodiments, the fuel consumption signal 489 represents a fuel consumption rate between about 0 and 20 L/hr.

The accelerometer 490 is configured to transmit an acceleration signal 491 representing the sensed acceleration to the conditioner 20. In various embodiments, the acceleration signal 491 represents one or more sensed acceleration between about 0 and 245 $m/s^2$. The fill level sensor 492 is configured to transmit a fill level signal 493 representing the sensed fill level to the conditioner 20. In various embodiments, the fill level signal 493 represents fill level between 0 and 100%.

The implement identifier device 494 is configured to transmit an implement identifier signal 495 representing the implement identifier to the conditioner 20. In various embodiments, the implement identifier signal 495 represents an implement identifier between 0000 and FFFF. The controller identifier device 496 is configured to transmit a controller identifier signal 497 representing the controller identifier to the conditioner 20. In various embodiments, the controller identifier signal 497 represents a controller identifier between 0000 and FFFF.

In some embodiments, a device may act as the user input device 480, the accelerometer 490, the implement identifier device 494, and/or the controller identifier device 496. For example, in some embodiments, a user may use push buttons on a user display unit of the device to set the user-input, implement identifier, and controller identifier.

In some embodiments, the pressure signal 483, travel speed signal 485, engine speed signal 487, temperature signal 499, fuel consumption signal 489, and fill level signal 493 may be transmitted on an electrical system or controller area network bus (CAN bus) of the propulsion unit 14 shown in FIG. 1. For example, any or all of the sensors, such as the hydraulic pressure sensor 482, travel speed sensor 484, engine speed sensor 486, hydraulic temperature sensor 498, fuel consumption sensor 488, and/or fill level sensors 492 may be an existing machine sensor that is included in the propulsion unit 14 and produces a respective signal on the electrical system or CAN bus of the propulsion unit 14 shown in FIG. 1.

In the embodiment shown, the signals 481, 483, 485, 487, 499, 489, 491, 493, 495, and 497 shown in FIG. 13 may act as the system information signals 49 shown in FIG. 3. Each of the signals, 481, 483, 485, 487, 499, 489, 491, 493, 495, and 497 may be one or more analog voltage signals having a voltage proportional to the sensed or measured value. In some embodiments, the signals may be digital signals representing sensed or measured values in binary hexadecimal code for example.

Figure 14:
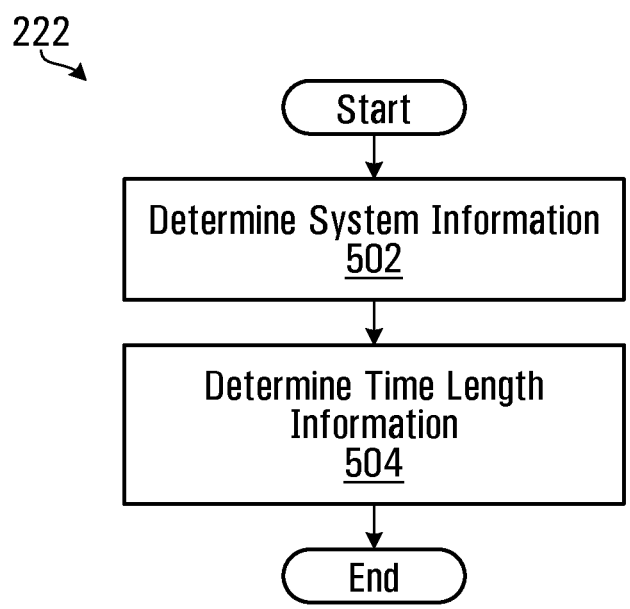
FIG. 14 is a flowchart depicting blocks of code for directing the conditioner shown in FIG. 5 to facilitate time length determining.

Referring to FIG. 14, a flowchart depicting the block of codes 222 for directing the processor circuit 200 shown in FIG. 5 to perform time length determining functions is shown. In various embodiments, the block of codes 222 may be executed periodically. For example, in some embodiments, the block of codes 222 may be executed once upon startup of the conditioner 20. In other embodiments, the block of codes 222 may be executed once every minute, for example.

Referring to FIG. 14, block 502 directs the conditioner processor 202 shown in FIG. 5 to determine system information by directing the conditioner processor 202 to cause the I/O interface 212 to receive the system information signals 481, 483, 485, 487, 499, 491, 493, 495 and 497 at the input ports 254, 256, 258, 259, 263, 264, 266, 268, 270, 272 and 274 respectively and to store a representation of the system information in locations 234 of the variable memory 206 shown in FIG. 5. The system information may be stored as a system information record as shown in FIG. 15.

Figure 15:
FIG. 15 is a representation of an exemplary system information record used by the processor circuit of FIG. 5.

Referring to FIG. 15, an exemplary system information record is shown at 540. In the embodiment shown, the system information record 540 includes a user input field 542 for storing a representation of user-defined speed, a hydraulic pressure field 544 for storing a representation of sensed pressure, a travel speed field 546 for storing a representation of sensed travel speed, an engine speed field 548 for storing a representation of sensed engine speed, a hydraulic temperature field 549 for storing a representation of sensed temperature of hydraulic fluid, an engine fuel consumption rate field 550 for storing a representation of a sensed fuel consumption rate, an acceleration field 554 for storing a representation of sensed acceleration, a fill level field 556 for storing a representation of a sensed fill level, an implement identifier field 558 for storing a representation of an implement identifier, and a controller identifier field 559 for storing a representation of a controller identifier. In the embodiment shown in FIG. 15, the acceleration field 554 stores a plurality of representations of sensed accelerations over a time period, which is shown as a graph in FIG. 15.

Referring back to FIG. 14, after block 502 has been completed, block 504 directs the conditioner processor 202 to determine time length information from the system information stored in the system information record 540 shown in FIG. 15 and stored in locations 234 of the variable memory 206 shown in FIG. 5 and to store the derived time length information in locations 232 of the variable memory 206.

Figure 16:
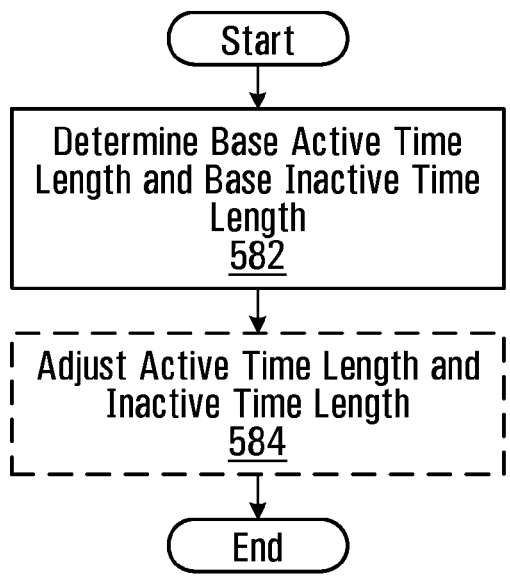
FIG. 16 is a flowchart depicting sub-blocks of code included in the blocks of code shown in FIG. 14.

Block 504 is shown in greater detail in FIG. 16 and includes a first block 582 which directs the conditioner processor 202 to determine a base active time length and a base inactive time length. In some embodiments, block 582 may direct the conditioner processor 202 to determine a base active time length based on the contents of the controller identifier field 559 of the system information record 540 shown in FIG. 15. For example, block 582 may direct the conditioner processor 202 to read the controller identifier from the controller identifier field 559 of the system information record 540 and use it to find a controller time length record stored in location 236 in the program memory 204 shown in FIG. 5. An exemplary representation of a controller time length record, in accordance with one embodiment of the invention, is shown at 600 in FIG. 17 and includes a controller identifier field 602 for storing a controller identifier, a base active time length field 606, a minimum active time length field 608, a maximum active time length field 610 and a cycle time length or sampling interval field 612.

Figures 17, 18:
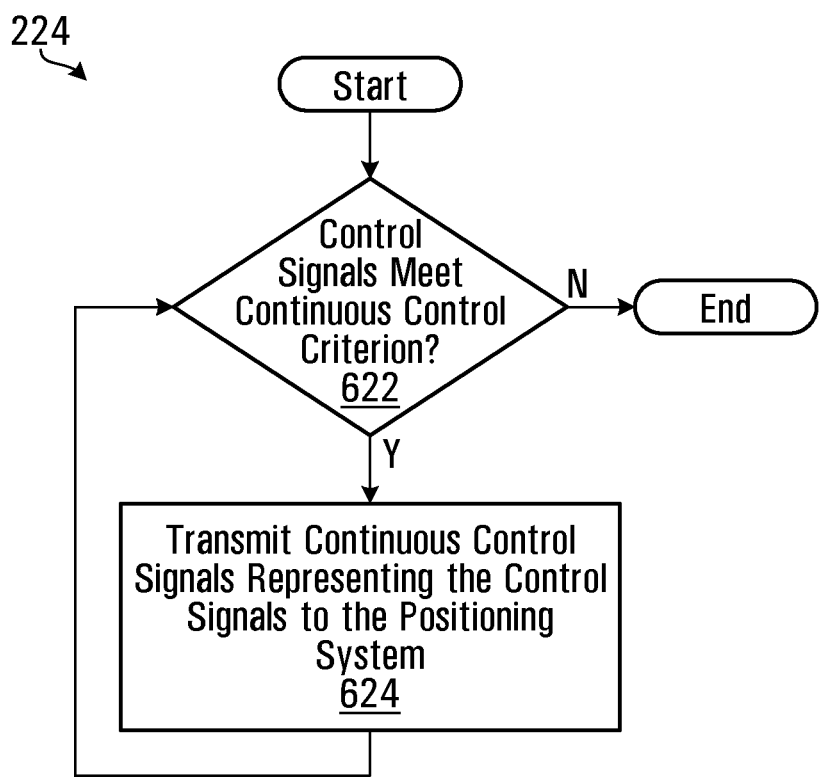
FIG. 17 is a representation of an exemplary controller time length record used by the processor circuit of FIG. 5.
FIG. 18 is a flowchart depicting blocks of code for directing the conditioner shown in FIG. 5 to facilitate continuous control override.

The base active time length field 606 shown in FIG. 17 stores an active time that facilitates accurate control by the controller identified by the controller identifier field 602 in base conditions (e.g., average expected values for system information). The minimum active time length field 608 and maximum active time length field 610 represent minimum and maximum active times that can facilitate control by the controller identified by the controller identifier field 602. The cycle time length field 612 stores a value representing a sampling interval time between the controller identified by the controller identifier field 602 sampling the position signals and updating the control signals.

Block 582 of FIG. 16 directs the conditioner processor 202 of FIG. 5 to derive a base active time length from the base active time length field 606 shown in FIG. 17 and to derive a base inactive time length by subtracting the base active time length from the cycle time length stored in the cycle time length field 612. Use of these base active and inactive times by the conditioner 20 causes the controller 18 shown in FIG. 3 to sample position signals and update control signals during inactive times (e.g. during the inactive times 370, 376, 378, and 414 shown in FIGS. 11A and 11B).

In various embodiments, a manufacturer of the conditioner 20 may conduct experiments employing various active time lengths when using the conditioner 20 to condition signals produced by the controller 18 to produce output signals for causing the positioning system 22 to move an average agricultural implement such as the header 12. In various embodiments, for example, the manufacturer may find that under normal conditions (i.e., average expected values for system information), the conditioner 20 best facilitates accurate control when the active time length is 20 ms. Accordingly, in various embodiments, the manufacturer may store in the controller time length record 600, a base active time length of 20 ms. Similarly, the manufacturer may determine minimum and maximum active time lengths through experimentation.

For universal application of the conditioner 20, the controller time length information location 236 of the program memory 204 shown in FIG. 5 may store a plurality of controller active time length records for a plurality of different controllers identified by respective controller identifiers. In various embodiments, a user can provide input via the controller identifier device 496 shown in FIG. 13 or the controller identifier device 496 may be included in the controller 18 shown in FIGS. 1-3 such that the controller identifier device 496 identifies the controller with which the conditioner is to be used and the time length determining codes will automatically determine appropriate active time and inactive time lengths, cycle time etc. for the identified controller, using the controller active time length record corresponding to the identified controller. Block 582 directs the conditioner processor 202 to store derived base active and base inactive time lengths in the active and inactive time length fields 422 and 424 in the signal time record 420 shown in FIG. 12 and stored in locations 232 of the variable memory 206 shown in FIG. 5.

In some embodiments, the flowchart shown in FIG. 16 may end after block 582. In other embodiments, the process may continue at block 584, which directs the conditioner processor 202 to adjust values stored in the active time length field 422 and the inactive time length field 424 of the signal time record 420 shown in FIG. 12 using information from the system information record 540 shown in FIG. 15.

For example, block 584 of FIG. 16 may direct the conditioner processor 202 to vary the contents of the active time length field 422 of the signal time record 420 shown in FIG. 12 based on contents of the user input field 542 of the system information record 540 shown in FIG. 15. When the user input field 542 stores a value of TRUE, this indicates that the user-defined speed is high and thus the user wishes that the system 10 shown in FIG. 3 react quickly. Therefore, block 584 may direct the conditioner processor 202 to increase the active time length stored in the active time length field 422 in response to the user input field 542 of the system information record 540 shown in FIG. 15 being set to TRUE.

In some embodiments, block 584 of FIG. 16 may direct the conditioner processor 202 to vary the contents of the active time length field 422 of the signal time record 420 shown in FIG. 12 based on contents of the hydraulic pressure field 544 and/or the engine speed field 548 of the system information record 540 shown in FIG. 15. High hydraulic pressure and low engine speed may indicate high loads that may result in low hydraulic power. Accordingly, block 584 may direct the conditioner processor 202 to compensate for low hydraulic power by increasing the active time length stored in the active time length field 422 when the hydraulic pressure field 544 and the engine speed field 548 represent high hydraulic pressure and low engine speed and thus represent low hydraulic power.

In some embodiments, block 584 of FIG. 16 may direct the conditioner processor 202 to vary the contents of the active time length field 422 of the signal time record 420 shown in FIG. 12 based on contents of the travel speed field 546 of the system information record 540 shown in FIG. 15. High travel speed may indicate that faster lift rates are required. Accordingly, block 584 may direct the conditioner processor 202 to increase the active time length stored in the active time length field 422 when the travel speed field 546 represents high travel speed.

In some embodiments, block 584 of FIG. 16 may direct the conditioner processor 202 to vary the contents of the active time length field 422 of the signal time record 420 shown in FIG. 12 based on contents of the engine speed field 548 of the system information record 540 shown in FIG. 15. Low engine speed may indicate reduced available hydraulic power and slower hydraulic system functions. Accordingly, block 584 may direct the conditioner processor 202 to compensate for the low power by increasing the active time length stored in the active time length field 422 when the engine speed field 548 represents low engine speed.

In some embodiments, block 584 of FIG. 16 may direct the conditioner processor 202 to vary the contents of the active time length field 422 of the signal time record 420 shown in FIG. 12 based on contents of the temperature field 549 of the system information record 540 shown in FIG. 15. High hydraulic temperature may result in lower hydraulic power that may result in low hydraulic function whereas low hydraulic temperature may result in higher hydraulic power. Accordingly, block 584 may direct the conditioner processor 202 to increase the active time length stored in the active time length field 422 when the temperature field 549 represents high temperature and/or to decrease the active time length stored in the active time length field 422 when the temperature field 549 represents low temperature.

In some embodiments, block 584 of FIG. 16 may direct the conditioner processor 202 to vary the contents of the active time length field 422 of the signal time record 420 shown in FIG. 12 based on contents of the engine fuel consumption rate field 550 and the travel speed field 546 of the system information record 540 shown in FIG. 15. In various embodiments, fuel consumption rate may be indicative of engine load. High travel speed at low engine load may indicate that the apparatus 30 shown in FIG. 1 is traveling downhill. Low travel speed at high engine load may indicate that the apparatus 30 shown in FIG. 1 is traveling uphill. In some embodiments, it may be desirable to slow down auto header height functions when traveling up or down hill, for stability.

Accordingly, in some embodiments, block 584 may direct the conditioner processor 202 to decrease the active time length stored in the active time length field 422 when the engine fuel consumption rate field 550 and the travel speed field 546 indicate that the apparatus 30 shown in FIG. 1 is traveling up or down hill. Thus, in some embodiments, block 584 may direct the conditioner processor 202 to decrease the active time length stored in the active time length field 422 when the engine fuel consumption rate field 550 represents high consumption and the travel speed field 546 represents low speed or when the engine fuel consumption rate field 550 represents low consumption and the travel speed field 546 represents high speed.

In some embodiments, block 584 of FIG. 16 may direct the conditioner processor 202 to vary the contents of the active time length field 422 of the signal time record 420 shown in FIG. 12 based on contents of the acceleration field 554 of the system information record 540 shown in FIG. 15. High frequency acceleration may be used to determine roughness of terrain. For example, in various embodiments, the roughness of the terrain may be classified as "soft", "medium" or "hard". A high level of high frequency acceleration may indicate that the terrain is rough or hard. In some embodiments, it may be desirable to have slower control and thus shorter active times in rough or hard terrain. Accordingly, block 584 may direct the conditioner processor 202 to decrease the active time length stored in the active time length field 422 when the acceleration field 554 represents a high level of high frequency acceleration.

Low frequency acceleration may be used to determine a pitching motion of the apparatus 30 shown in FIG. 1. Accordingly, block 584 may direct the conditioned processor 202 to decrease the active time length stored in the active time length field 422 when the acceleration field 554 represents a low frequency accelerator.

In some embodiments, block 584 of FIG. 16 may direct the conditioner processor 202 to vary the contents of the active time length field 422 of the signal time record 420 shown in FIG. 12 based on contents of the fill level field 556 of the system information record 540 shown in FIG. 15. The fill level may be indicative of a mass of the propulsion unit 14. For example, fill level of crop load may add several tons to an operating mass of the propulsion unit 14 shown in FIG. 1 as it fills. High mass of the propulsion unit 14 may indicate that header height control is able to be more aggressive without causing the apparatus 30 shown in FIG. 1 to pitch. Accordingly, block 584 may direct the conditioner processor 202 to increase the active time length stored in the active time length field 422 when the fill level field 556 represents a high fill level and thus a large mass of the propulsion unit 14. In various embodiments, the mass of the propulsion unit may be derived from both the fill level and a capacity of the propulsion unit. Accordingly, an amount by which the active time is varied may depend not only on the fill level but also on a capacity of the propulsion unit 14, which may be determined, for example, using the contents of the controller identifier field 559 of FIG. 15, which may correspond to a type of propulsion unit, and a lookup table stored in the program memory 204 shown in FIG. 5, for example.

In some embodiments, block 584 of FIG. 16 may direct the conditioner processor 202 to vary the contents of the active time length field 422 of the signal time record 420 shown in FIG. 12 based on contents of the implement identifier field 558 of the system information record 540 shown in FIG. 15. In various embodiments, the implement identifier may be associated with an inertia of the agricultural implement identified by the implement identifier, for example, by a lookup table stored in the program memory 204 of the conditioner processor circuit 200 shown in FIG. 5. Block 584 may direct the conditioner processor 202 to look up in the look up table, an inertia of the agricultural implement using the implement identifier from the implement identifier field 558. High inertia may indicate that the agricultural implement is difficult to move. Accordingly, block 584 may direct the conditioner processor 202 to increase the active time length stored in the active time length field 422 when the implement identifier field 558 stores an implement identifier associated with a high inertia.

In some embodiments, block 584 of FIG. 16 may direct the conditioner processor 202 to read the minimum and maximum active time length fields 608 and 610 of the controller time length record 600 shown in FIG. 17 and limit the adjustments to the active time length to keep the active time length between the minimum and maximum active time lengths.

In some embodiments, block 584 may direct the conditioner processor 202 to vary the contents of the inactive time length 424 of the signal time record 420 shown in FIG. 12 to equal a difference between the times represented by the cycle time length field 612 of the controller time length record 600 shown in FIG. 17 and the updated active time length field 422, such that the sum of the active time length and the inactive time length remains equal to the cycle time length.

Accordingly, the conditioner processor 202 may be directed to store adjusted or updated time length information in locations 232 of the variable memory 206 shown in FIG. 5. As described above, the conditioner processor 202 may be directed to use the time length information stored in the locations 232 of the variable memory 206 when producing the output signals 50 and 52. Accordingly, the conditioner processor 202 may be directed to use updated time length information, which has been determined using the process depicted by the flowchart shown in FIG. 14, when producing the output signals 50 and 52.

Continuous Control

Referring to FIG. 1, in various embodiments, a user may wish to control the positioning system 22 manually, such as, for example, when the user is finished harvesting and wishes to raise the header 12. In such embodiments, for example, the user causes the controller 18 to continuously transmit output signals 50 and 52 (shown in FIG. 3) that are in the up control state to raise the header 12 or to continuously transmit output signals 50 and 52 in the down control state to lower the header 12. The conditioner 20 may normally condition the signals before transmitting output signals to the positioning system 22. However, when the user wishes to manually raise or lower the header 12, in various embodiments, conditioning the continuous control signals may cause the positioning system to move slower than is necessary.

Accordingly, in some embodiments, referring to FIG. 3, the conditioner 20 may be configured to determine whether the control signals 46 and 48 represent continuous or manual control by a user and, if the control signals 46 and 48 represent continuous or manual control, to transmit output signals to the positioning system 22, which are not conditioned. In various embodiments, the conditioner 20 may be configured to simply relay representations of the control signals as output signals to the positioning system 22 when the control signals represent continuous or manual control.

Referring to FIG. 18, block of codes 224 shown in FIG. 5 for directing the processor circuit 200 to perform continuous control override functions is shown in greater detail. The blocks of code 224 may be executed after block 302 and before block 304 shown in FIG. 7 is executed.

Referring to FIG. 18, block 622 directs the conditioner processor 202 to determine whether the control signals meet a continuous control criterion. For example this criterion may be met when the lift and drop control signals 46 and 48 are in an up control state or in a down control state and have not changed for a certain threshold period of time. In various embodiments, during normal automatic control of the positioning system 22 by the controller 18, the controller may not keep the lift and drop control signals 46 and 48 in an up or down control state for longer than the threshold period of time, due to the speed of the system 10 shown in FIG. 3. Accordingly, when the control signals 46 and 48 have not changed in greater than the threshold period of time, this may be indicative of manual user control.

Figures 19, 20:
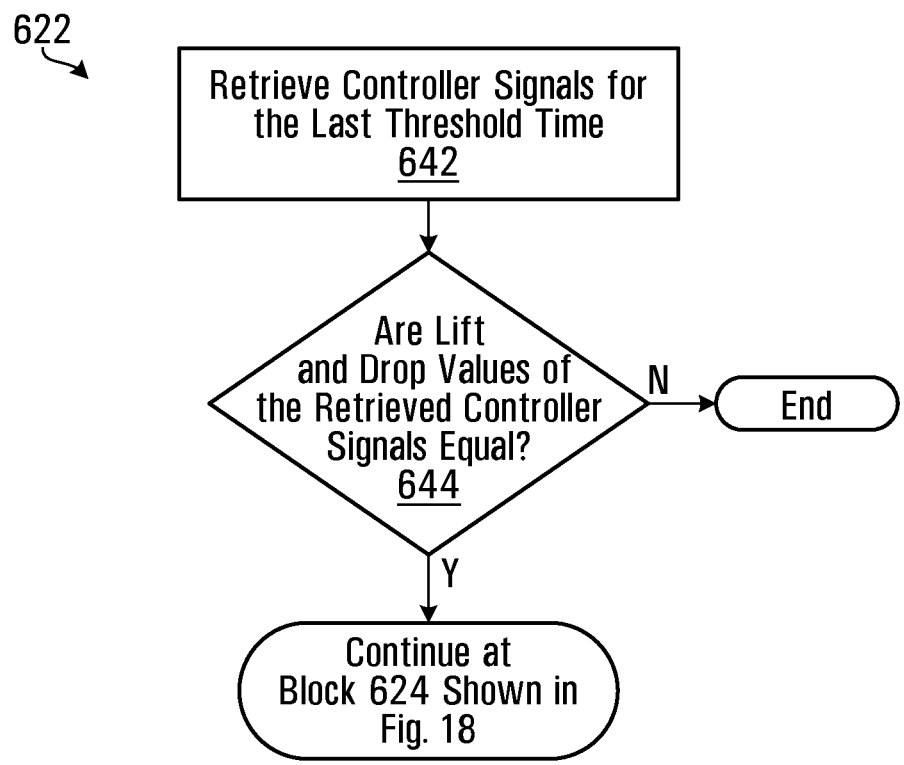
FIG. 19 is a flowchart depicting sub-blocks of code included in the blocks of code shown in FIG. 18.
FIG. 20 is a representation of an exemplary threshold time record used by the processor circuit of FIG. 5.
Figure 21:
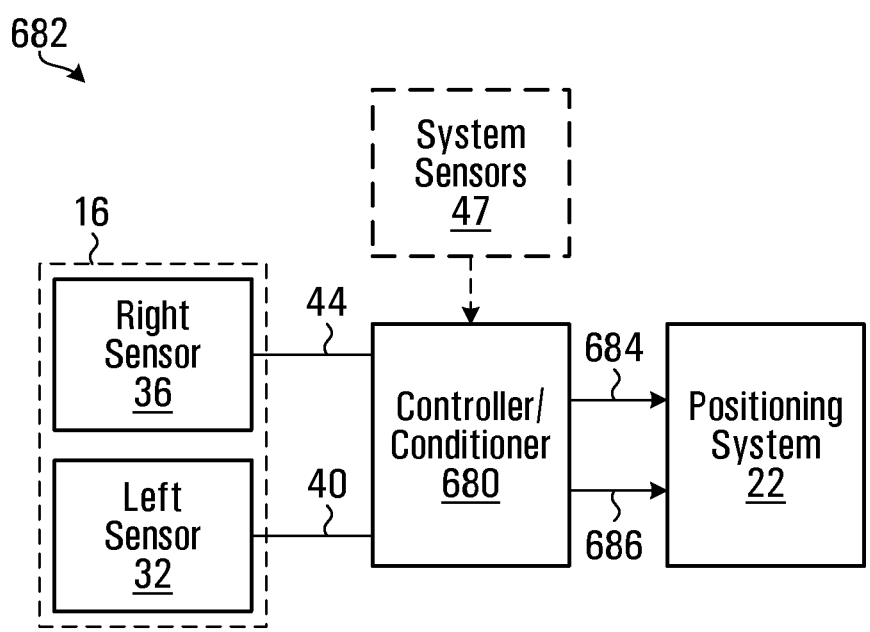
FIG. 21 is a schematic view of a system for controlling movement of an agricultural implement according to one embodiment of the invention.

Referring to FIG. 19, in some embodiments, block 622 includes sub-blocks of code including block 642 which directs the conditioner processor 202 to retrieve control signals for the last threshold period of time. This is done by directing the conditioner processor 202 to retrieve a threshold control time from a threshold time record 660 such as shown in FIG. 21 from location 238 of the program memory 204. The threshold time record 660 may include a threshold time field 662 representing a threshold time period to be used in determining whether continuous control criterion are met.

Block 642 of FIG. 19 may direct the conditioner processor 202 shown in FIG. 5 to retrieve all controller signal records from locations 230 of the variable memory 206 that include time fields representing times within the time represented by the threshold time record 660 shown in FIG. 20. Accordingly, where the threshold time field 662 stores a time of 1.5 seconds, block 642 may direct the conditioner processor 202 to retrieve controller signal records that include time fields representing times that are within 1.5 seconds of a current time. In some embodiments, the threshold time may be between about 1.0 seconds and about 2.0 seconds.

Block 644 of FIG. 19 then directs the conditioner processor 202 to read the lift and drop valve fields of the controller signal records retrieved in block 642 to determine whether the lift and drop valve fields store equal values for each of the controller signal records retrieved. If the lift and drop values indicated in each of the retrieved records are equal, block 644 directs the conditioner processor 202 to determine that the control signals 46 and 48 meet the continuous control criterion and the conditioner processor 202 is directed to continue at block 624 of FIG. 18.

In some embodiments, block 644 of FIG. 19 may direct the conditioner processor 202 of FIG. 5 to first determine whether the lift and drop valve fields store all FALSE values, and if the conditioner processor 202 determines that the lift and drop valve fields store all false values, then block 644 directs the conditioner processor to determine that the control signals 46 and 48 do not meet the continuous control criterion and directs the conditioner processor 202 to end the process.

If the lift and drop values are not equal, block 644 of FIG. 19 directs the conditioner processor 202 of FIG. 5 to determine that the control signals 46 and 48 do not meet the continuous control criterion and directs the conditioner processor 202 to end as shown in FIGS. 18 and 19.

In some embodiments, the value stored in the threshold time field 662 of the threshold time record 660 shown in FIG. 20 may be set by a manufacturer of the conditioner 20 for example. The value stored in the threshold time field 662 may represent a time that the manufacturer has found through experimentation, for example to indicate that a user has taken control of the controller 18. In various embodiments, the time represented by the threshold time field 662 may be large enough such that when the controller 18 is automatically controlling the position of the header 12 shown in FIG. 2 during normal use (i.e., while travelling along a field and harvesting crop), block 644 of the flowchart shown in FIG. 18 would not direct the conditioner processor to continue at block 624 of the flowchart shown in FIG. 19.

Referring back to FIG. 18, after block 622 has been executed, if the control signals meet the continuous control criterion, block 624 directs the conditioner processor 202 shown in FIG. 5 to produce continuous control signals representing received control signals to the positioning system 22. For example, block 624 may direct the conditioner processor 202 to set the lift and drop output signals 50 and 52 at the output ports 260 and 262 to respective voltages representing the received control signals. More particularly, block 624 may direct the conditioner processor 202 to retrieve a most recent controller signal record from the locations 230 of the variable memory 206 shown in FIG. 5 and cause the output ports 260 and 262 to set the lift and drop output signals 50 and 52 to voltages representing the values of the lift and drop valve fields respectively of the retrieved controller signal record. For example, where the lift and drop valve fields store values of TRUE and FALSE respectively, block 624 may direct the conditioner processor 202 shown in FIG. 5 to cause the output ports 260 and 262 of the I/O interface 212 to set the lift output signal 50 to $V_H$ and the drop output signal 52 to $V_L$.

After block 624 is completed, the conditioner processor 202 is directed to return to block 622. If at block 622, the conditioner processor 202 determines that the control signals do not meet the continuous control criterion, the process ends, otherwise block 624 is repeated until the control signals do not meet the continuous control criterion.

In embodiments where the continuous control block of codes 220 is executed after block 302 and before block 304, once execution of the continuous control block of codes 220 has ended, the conditioner processor 202 is directed to execute block 304. Accordingly, in some embodiments, block 304 is executed only if block 622 determines that the control signals do not meet the continuous control criterion.

In some embodiments, block 622 of FIG. 18 may direct the conditioner processor 202 shown in FIG. 5 to determine that the control signals meet the continuous control criterion in other ways than as described above with reference to FIG. 19. For example, in some embodiments, the controller 18 may produce a user control signal 650 that may be intercepted or received at port 274 of the I/O interface 212 of the processor circuit 200 shown in FIG. 5. In such embodiments, the control signals received by the conditioner may include the lift control signal 46, the drop control signal 48 and the user control signal 650.

For example, the controller 18 may be configured to set the user control signal 650 shown in FIG. 5 to $V_H$ when a user is manually controlling the controller 18 and to set the user control signal to $V_L$ when a user is not manually controlling the controller 18. Block 622 may direct the conditioner processor 202 to determine whether the control signals meet the continuous control criterion by determining whether the user control signal 650 received at the input port 272 shown in FIG. 5 is set to $V_H$. In such embodiments, if the user control signal 650 is set to $V_H$, block 622 may direct the conditioner processor 202 to determine that the control signals meet the continuous control criterion.

Lateral Tilt

Referring back to FIG. 4, in some embodiments, the positioning system 22 may include a tilt hydraulic cylinder for controlling a lateral tilt of the header 12 shown in FIG. 1. Extension of the tilt hydraulic cylinder may cause the front portion 66 of the feeder house 60 shown in FIG. 4 to tilt laterally from left to right (i.e., to rotate the front portion 66 about a pivot point of the front portion by raising a left side of the front portion 66 and lowering a right side of the front portion).

In some embodiments, the controller 18 may be configured to produce tilt control signals in addition to the signals already described, based on the received left and right position signals 40 and 44. The tilt control signals may be configured to control the tilt hydraulic cylinder and thus cause the positioning system 22 to control a lateral tilt of the header 12 shown in FIG. 1. In some embodiments, the controller 18 may be configured to cause the tilt control signals to direct the positioning system 22 to tilt the header 12 such that the heights of the left and right sensors 32 and 36 are equal. In some embodiments, the controller 18 may be configured to transmit the tilt control signals directly to the positioning system 22. In some embodiments, the controller 18 may transmit the tilt control signals to the conditioner 20, and the conditioner 20 may relay the tilt control signals to the positioning system 22. In some embodiments, the conditioner 20 may condition the tilt control signals generally as described above having regard to the lift and drop control signals 46 and 48 shown in FIG. 3.

Variable Valve Hydraulic Cylinders

In various embodiments, other types of height control may be used generally as described above. For example, a height-controlling hydraulic cylinder generally similar to the height-controlling hydraulic cylinder 64 shown in FIG. 4 may include, instead of the solenoid controlled lift and drop valves, current controlled variable lift and drop valves. The current controlled variable lift and drop valves may be configured to control a flow of fluid through the valves in proportion to a current applied to inputs on the valves, for example. In some embodiments, the conditioner 20 may be configured to transmit conditioned output signals representing a plurality of active times during which one of the current controlled variable lift and drop valves is caused to open fully and a plurality of inactive times during which the current controlled variable lift and drop valves are caused to close, with each active time being followed by a respective one of the inactive times. The inactive times may be sufficiently long to permit the agricultural implement to settle into a fixed position due to the positioning response time of the positioning system 22.

Controller/Conditioner Processor Circuit

Referring to FIG. 21, in alternative embodiments, functions of the controller 18 and the conditioner 20 shown in FIGS. 1-3 and described above may be integrated into a single controller/conditioner 680 in a system 682 shown in accordance with one embodiment in FIG. 21. The system 682 may be generally similar to the system 10 shown in FIG. 3, except that the system 682 includes the controller/conditioner 680 in place of the controller 18 and the conditioner 20 shown in FIGS. 1-3. The system 682 shown in FIG. 21 includes the sensor system 16 and the positioning system 22 of FIGS. 1-3. In various embodiments, the system 682 may also include the system sensors 47 of FIG. 3.

The sensors 32 and 36 are configured to produce left and right position signals 40 and 44 representing sensed positions or heights of the header 12 shown in FIG. 1 and the controller/conditioner 680 is configured to receive the left and right position signals 40 and 44 and to receive desired position signals representing desired positions or heights of the header 12. In various embodiments, the controller/conditioner 680 is configured to determine a difference between the sensed heights and the desired heights, to derive conditioned lift and drop output signals 684 and 686 from the difference and to transmit the conditioned lift and drop output signals 684 to the positioning system 22.

The lift and drop output signals 684 and 686 are as earlier described and represent a plurality of active times during which the positioning system 22 is instructed to move a header such as the header 12 shown in FIG. 1 towards the desired height and a plurality of inactive times during which the positioning system 22 is instructed not to move, each active time being followed by a respective one of the plurality of inactive times, wherein each of the plurality of inactive times is sufficiently long to permit the header 12 shown in FIG. 1 to settle into a fixed position due to the positioning response time of the positioning system 22.

Figure 22:
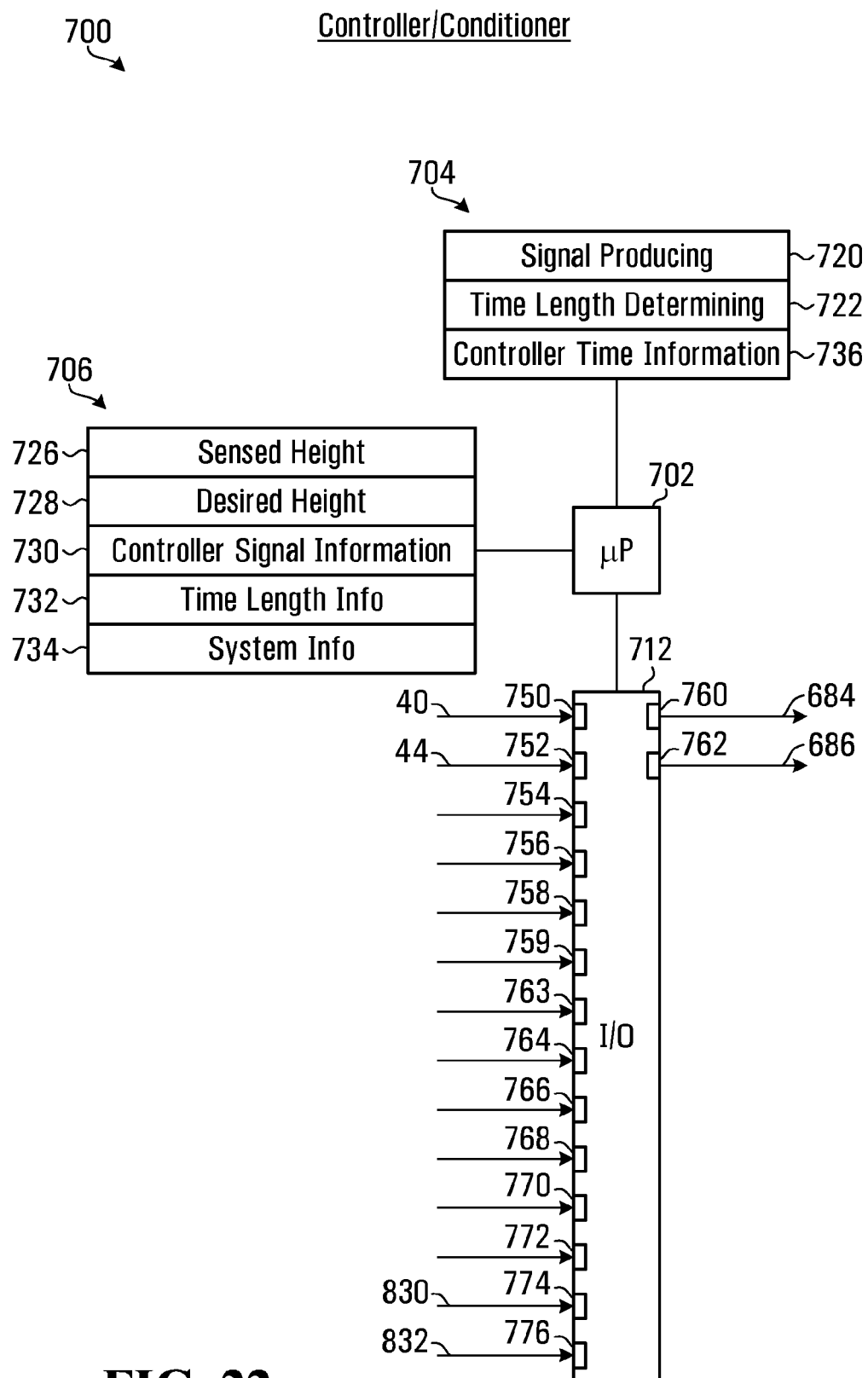
FIG. 22 is a schematic view of a processor circuit for implementing a controller/conditioner included in the system of FIG. 21.

Referring to FIG. 22, a schematic view of a controller/conditioner processor circuit for implementing the controller/conditioner 680 shown in FIG. 21 according to one embodiment is shown generally at 700.

In various embodiments similar aspects of the controller/conditioner processor circuit 700 shown in FIG. 22 may be implemented generally similarly to that described above in connection with the processor circuit 200 shown in FIG. 5.

Referring to FIG. 22, the controller/conditioner processor circuit 700 includes a controller/conditioner processor 702, a program memory 704, a variable memory 706, and an input output ("I/O") interface 712, all of which are in communication with the controller/conditioner processor 702.

The program memory 704 includes a block of codes 720 for directing the controller/conditioner processor 702 to perform signal producing functions and a block of codes 722 for directing the controller/conditioner processor 702 to perform time length determining functions. The program memory 704 may also include at least one location 736 for storing controller time information.

The variable memory 706 includes a plurality of storage locations including locations 726 for storing sensed height information, locations 728 for storing desired height information, locations 730 for storing controller signal information, locations 732 for storing time length information, and locations 734 for storing system information.

The I/O interface 712 may include input ports 750 and 752 for receiving the left and right position signals 40 and 44 and output ports 760 and 762 for producing and transmitting the output signals 684 and 686. In the embodiment shown, the I/O interface 712 also includes input ports 754, 756, 758, 759, 763, 764, 766, 768, 770, and 772 for receiving user input signals, pressure signals, travel speed signals, engine speed signals, temperature signals, fuel consumption signals, acceleration signals, fill level signals, implement identifier signals, and controller identifier signals, respectively such as described previously. In some embodiments, the I/O interface 712 may also include input ports 774 and 776 for receiving desired position signals.

Controller/Conditioner Signal Producing

Figure 23:
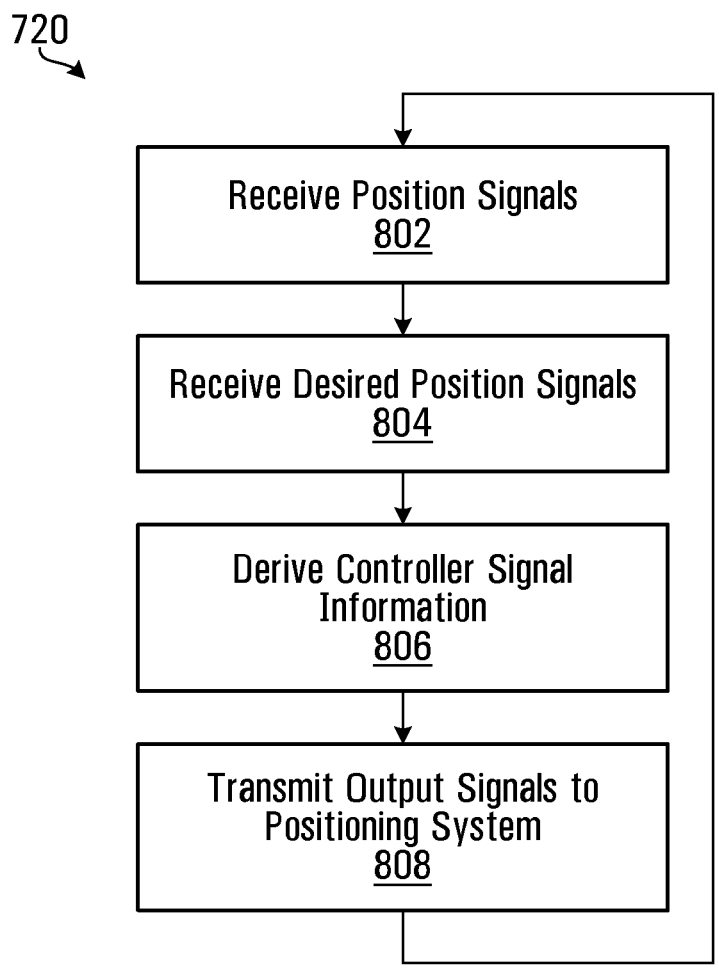
FIG. 23 is a flowchart depicting blocks of code for directing the controller/conditioner shown in FIG. 22 to facilitate signal producing.

Referring to FIG. 23, block of codes 720 for directing the controller/conditioner processor circuit 700 shown in FIG. 22 to produce conditioned lift and drop output signals is shown.

The block of codes 720 begins with block 802 which directs the controller/conditioner processor 702 shown in FIG. 22 to receive position signals. In various embodiments, block 802 may direct the controller/conditioner processor 702 to cause the I/O interface 712 to receive the left and right position signals 40 and 44 shown in FIG. 21 via the input ports 750, and 752 shown in FIG. 22. In some embodiments, block 802 may direct the controller/conditioner processor 702 to convert the position signals into values representing heights or separation distances and to store the values in the locations 726 of the variable memory 706.

Figures 24, 25, 26:
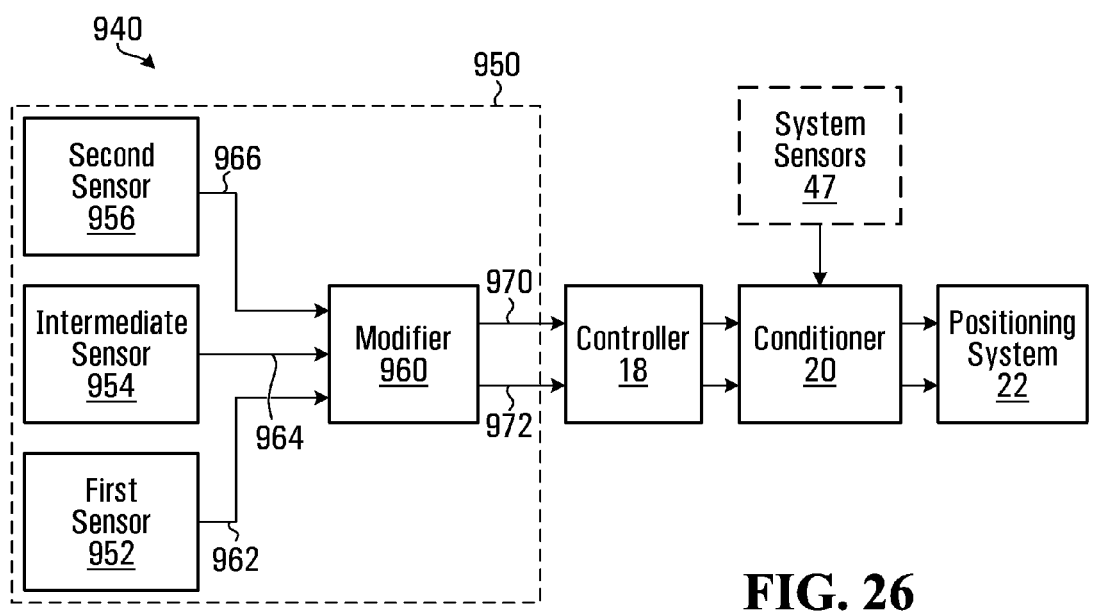
FIG. 24 is a representation of an exemplary sensed height record used by the processor circuit of FIG. 22.
FIG. 25 is a representation of an exemplary desired height record used by the processor circuit of FIG. 22.
FIG. 26 is a schematic view of a system for controlling movement of an agricultural implement according to one embodiment of the invention.

In some embodiments, block 802 may direct the controller/conditioner processor 702 shown in FIG. 22 to store the representations of the heights as digital values representing heights of between 0 inches and 18 inches. Block 802 directs the controller/conditioner processor to store the representations in a sensed height record 820, such as shown in FIG. 24, in locations 726 of the variable memory 706. The sensed height record 820 includes a left sensed height field 822 and a right sensed height field 826 for storing representations of the heights represented by the signals 40 and 44 respectively.

Referring to FIG. 23, block 804 then directs the controller/conditioner processor to receive a desired position signal representing a desired position. In some embodiments, a desired height input device may be in communication with the input ports 774 and 776 of the I/O interface 712 shown in FIG. 22. In various embodiments, the desired height input device may include one or more user controllable voltage sources for producing one or more desired position signals having voltages representing desired heights for the left and right sensors 32 and 36, shown in FIG. 21 for example.

Referring back to FIG. 23, in some embodiments, block 804 may direct the controller/conditioner processor 702 shown in FIG. 22 to cause the input ports 774 and 776 of the I/O interface 712 to receive left and right desired position signals 830 and 832 having voltages representing desired heights for the left and right sensors 32 and 36. Block 804 may direct the controller/conditioner processor 702 to store in the locations 728 of the variable memory 706 shown in FIG. 22, a desired height record 840 as shown in FIG. 25 including a left desired height field 842 and a right desired height field 844 storing values based on the received left and right desired height signals 830 and 832.

Block 806 of FIG. 23 then directs the controller/conditioner processor 702 shown in FIG. 22 to derive controller signal information from differences between the desired positions and the sensed positions. For example, block 806 may direct the controller/conditioner processor 702 to determine a left difference between a left sensed height represented by the left sensed height field 822 of the sensed height record 820 shown in FIG. 24 and a left desired height represented by the left desired height field 842 of the desired height record 840 shown in FIG. 25. Block 806 may also direct the controller/conditioner processor 702 to determine a right difference between the right sensed height represented by the right sensed height field 824 and the right desired height represented by the right desired height field 844 of the desired height record 840 shown in FIG. 25.

Referring back to FIG. 23, block 806 directs the controller/conditioner processor 702 to store a controller signal record having an up control state in locations 730 of the variable memory 706 shown in FIG. 22 (having a lift valve field set to TRUE and a drop valve field set to FALSE) if at least one of the left and right differences represents a sensed height that is less than a desired height and the difference has magnitude greater than a threshold difference. If neither of the left and right differences represents a sensed height that is less than a desired height and has magnitude greater than the threshold difference and at least one of the left and right differences represents a sensed height that is more than a desired height and has a magnitude greater than the threshold difference then block 806 directs the controller/conditioner processor 702 to store a controller signal record having a down control state in locations 730 of the variable memory 706 shown in FIG. 22 (having a lift valve field set to FALSE and a drop valve field set to TRUE). Otherwise, block 806 directs the controller/conditioner processor 702 to store a controller signal record having an off control state in locations 730 of the variable memory 706 shown in FIG. 22 (having a lift valve field and drop valve field set to FALSE)

Block 806 thus directs the controller/conditioner processor 702 to store a controller signal record having an up control state in locations 730 of the variable memory 706 shown in FIG. 22 if one of the left and right differences represents a sensed height less than a desired height by more than the threshold difference, regardless of the contents of the other of the left and right differences. This may facilitate the controller/conditioner 680 directing the positioning system 22 to avoid a collision between an agricultural implement and the ground.

In various embodiments, the threshold difference may be set by a manufacturer of the controller/conditioner. In some embodiments, the threshold difference may between 0 and 1 inch and may represent a height difference of about 0.5 inches, for example.

Block 808 of FIG. 23 directs the controller/conditioner processor 702 to cause the I/O interface 712 to produce at least one output signal to be provided to the positioning system 22 shown in FIG. 21 wherein the at least one output signal represents an active time during which the positioning system 22 is instructed to move the header 12 shown in FIG. 1 towards a desired position and an inactive time following the active time during which the positioning system 22 is instructed not to move, wherein the inactive time is sufficiently long to permit the header 12 to settle into a fixed position due to the positioning response time of the positioning system 22. In some embodiments, block 808 may direct the controller/conditioner processor 702 to cause the output ports 760 and 762 to transmit the output signals 684 and 686 to the positioning system 22 shown in FIG. 21. Block 808 may be generally similar to block 304 shown in FIG. 7 as discussed above. After block 808 has completed, the controller/conditioner processor has completed a cycle and may be directed to return to block 802 to begin a new cycle.

In some embodiments, blocks of code for directing the controller/conditioner processor circuit 700 shown in FIG. 22 to perform time length determining may be encoded in the block of codes 722 shown in FIG. 22. In various embodiments, the blocks of code similar to those shown at 222 in FIG. 14, except that they may be configured to direct the controller/conditioner processor 702 to perform the process. In various embodiments, for the time length determining encoded in the block of codes 722 shown in FIG. 22, steps relating to the controller identifier signals may be omitted and the controller time length information may include a single controller time length record associated with the controller/conditioner 680. In such embodiments, the controller time length record associated with the controller/conditioner may include a cycle time length field representing a base cycle time length that facilitates accurate control of an average positioning system. Further, the controller time length record may not need to include a controller identifier field.

Sensor System Including a Modifier

A field over which an agricultural implement is driven may include ground inconsistencies such as, for example, bumps and hills. In various embodiments, a user may wish to be able to sense a position of the agricultural implement relative to the ground at an intermediate location on the agricultural implement. For example, a user may wish to sense a position of the agricultural implement relative to the ground between left and right sensors, which may act as first and second sensors, to avoid driving the agricultural implement into a bump that is located between the left and right sensors.

Figure 28:
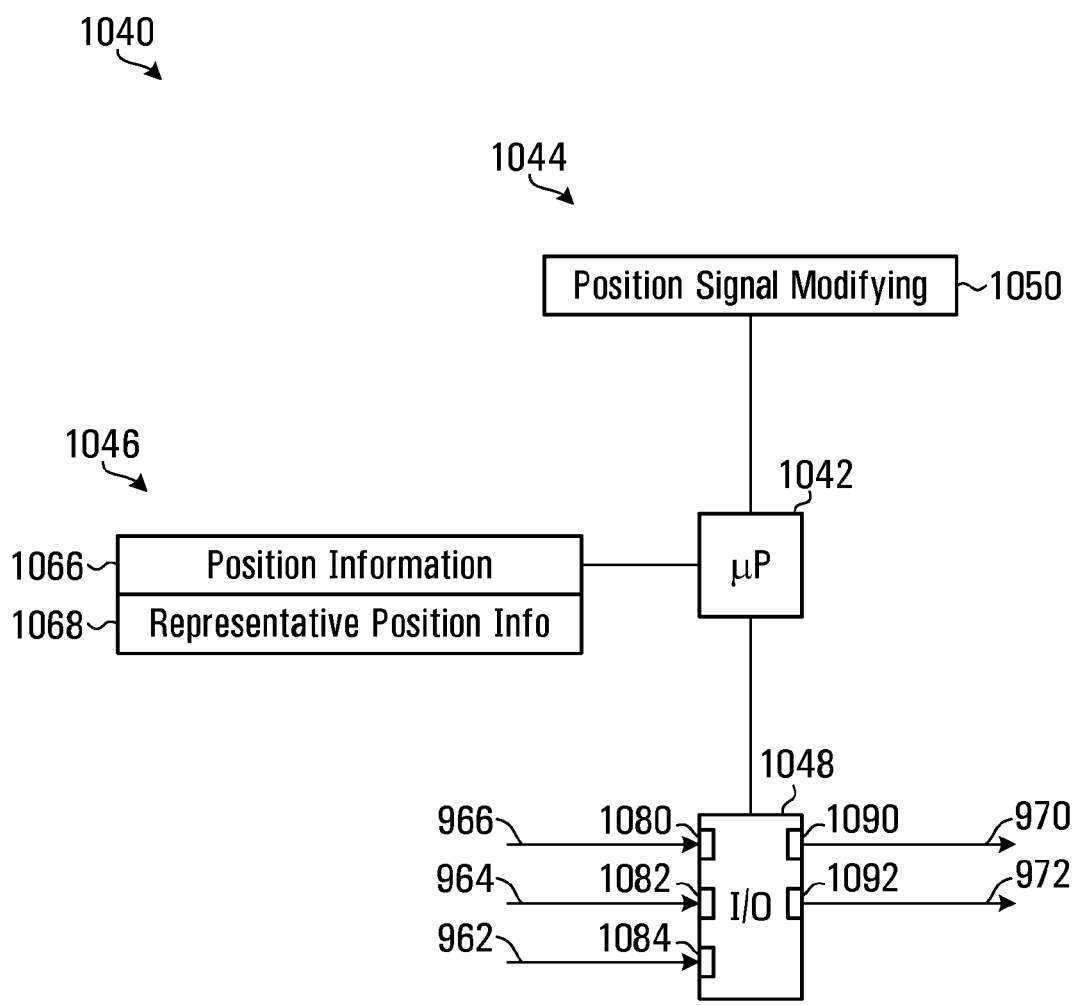
FIG. 28 is a schematic view of a processor circuit for implementing a modifier included in the system of FIG. 26.

Referring to FIG. 26 there is shown a system 940 according to another embodiment that is generally similar to the system 10 shown in FIGS. 1 and 3 except that the system 940 includes a different sensor system 950 in place of the sensor system 16. The different sensor system 950 shown in FIG. 26 is configured to transmit first and second representative position signals 970 and 972 to the controller 18, which may be received and handled generally as described above in the same way as the left and right position signals 40 and 44 shown in FIGS. 3 and 21. Accordingly, the sensor system 950 may be configured to be substitutable for the sensor system 16 shown in FIGS. 3 and 21, for example The different sensor system 950 includes first and second sensors 952 and 956, an intermediate or central sensor 954, and a modifier 960. FIG. 28 shows an agricultural apparatus in accordance with one embodiment, which includes the first, intermediate, and second sensors 952, 954, and 956. In the embodiment shown, the agricultural apparatus 1000 is an agricultural combine harvester including a header 1002 mounted to a propulsion unit 1004.

Figure 27:
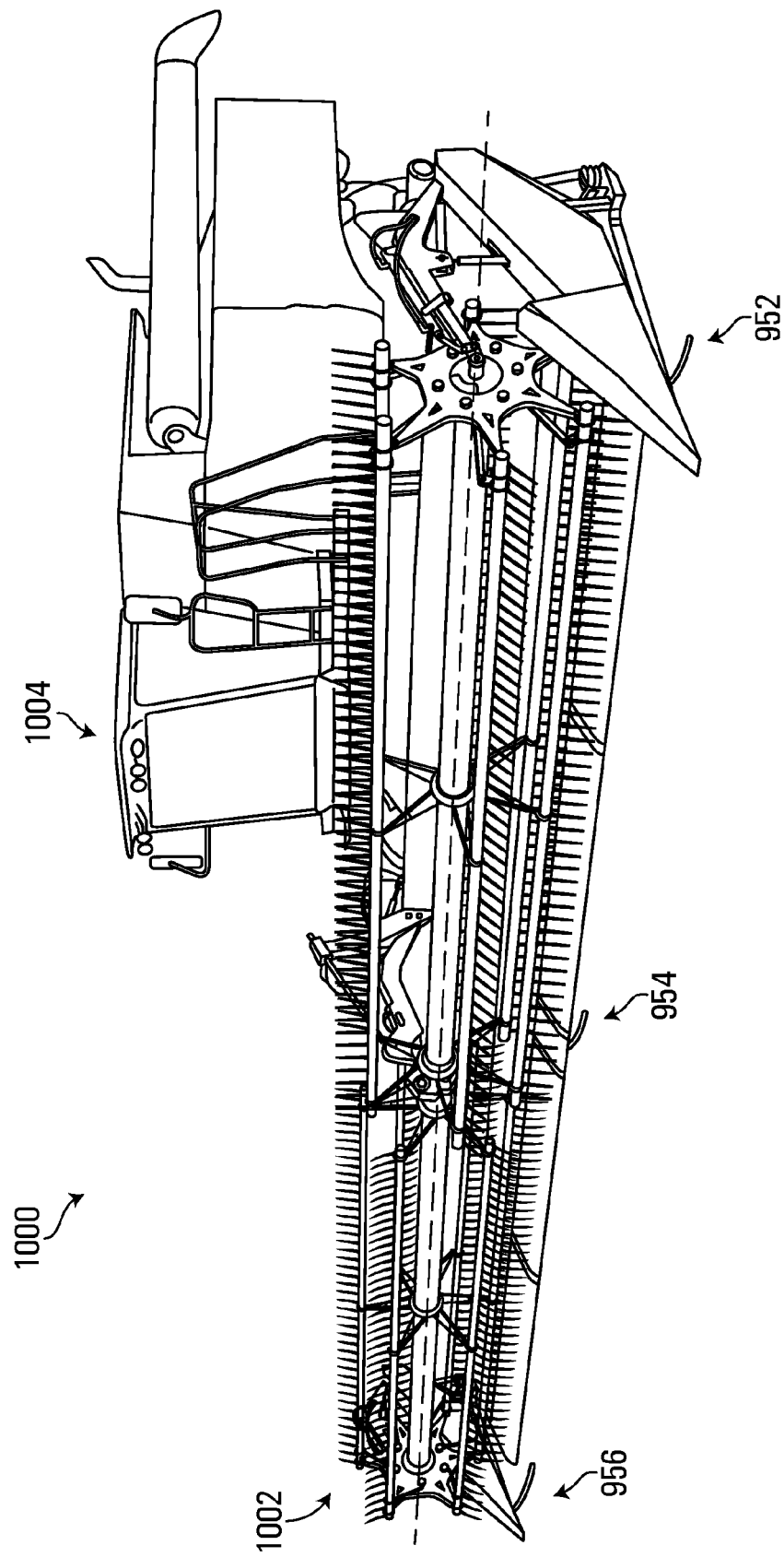
FIG. 27 is a perspective view of an agricultural apparatus including the system of FIG. 26.

Referring to FIG. 27, the first and second sensors 952 and 956 are mounted to an underside of the header 1002 at first and second spaced apart locations on the header 1002. The first and second sensors 952 and 956 are located at opposite ends of the header 1002 and act as left and right sensors. The first and second sensors 952 and 956 sense first and second positions or separation distances of the header 1002 relative to the ground at the first and second locations respectively. The first and second sensors 952 and 956 may be generally similar to the left and right sensors 32 and 36 shown in FIG. 1.

Referring still to FIG. 27, the intermediate sensor 954 is mounted to an underside of the header 1002 at an intermediate location disposed generally between the first and second sensors 952 and 956. The intermediate sensor 954 senses an intermediate position or separation distance of the header 1002 relative to the ground at the intermediate location. The intermediate sensor 954 may be generally similar to the first and second sensors 952 and 956.

Referring back to FIG. 26, the first, intermediate, and second sensors 952, 954, and 956 produce first, intermediate, and second position signals 962, 964, and 966 respectively, representing the first, intermediate, and second positions of the first, intermediate and second locations of the header 1002 relative to the ground.

The modifier 960 receives the first, intermediate, and second position signals 962, 964, and 966 and, when the intermediate position meets a reference surface proximity criterion, transmits to the controller at least one modified representative position signal representing at least one modified position that differs from the first and second positions.

The reference surface proximity criterion may be met for example when the intermediate position is indicative of the header 1002 shown in FIG. 27 getting close to the ground and the modifier 960 may, when the intermediate position meets the reference surface proximity criterion, cause the first representative position signal 970 to represent a position closer to the ground than the first position and/or cause the second representative position signal 972 to represent a position closer to the ground than the second position.

Accordingly, in various embodiments, when the intermediate position is indicative of the header 1002 shown in FIG. 27 getting close to the ground, the modifier 960 modifies the first and second representative position signals 970 and 972 such that the controller 18 is more likely to cause the header 1002 to be raised. In various embodiments, this may facilitate avoidance of impact of the header 1002 with the ground.

Referring to FIG. 28, a modifier processor circuit for implementing the modifier 960 shown in FIG. 26 according to one embodiment is shown generally at 1040. The modifier processor circuit 1040 includes a modifier processor 1042, a program memory 1044, a variable memory 1046, and an I/O interface 1048, all of which are in communication with the modifier processor 1042.

The program memory 1044 includes a block of codes 1050 for directing the modifier processor 1042 to perform position signal modifying functions. The variable memory 1046 includes a plurality of storage locations including locations 1066 for storing position information and locations 1068 for storing representative position information. The I/O interface 1048 includes input ports 1080, 1082, and 1084 for receiving the second, intermediate, and first position signals 966, 964, and 962 and output ports 1090 and 1092 for producing and transmitting the first and second representative position signals 970 and 972.

Similar elements of the modifier processor circuit 1040 shown in FIG. 28 may be implemented generally similarly to those described above in connection with the processor circuit 200 shown in FIG. 5.

Figure 29:
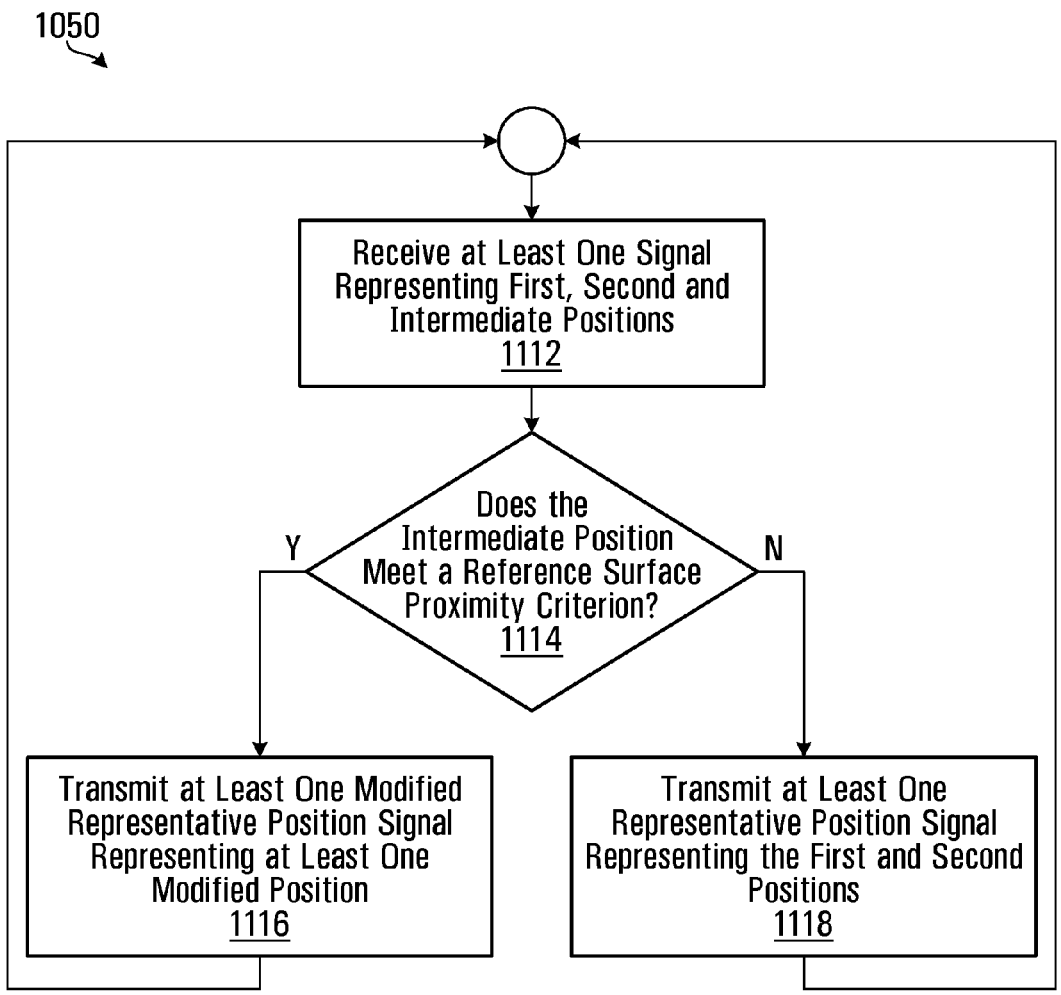
FIG. 29 is a flowchart depicting blocks of code for directing the modifier shown in FIG. 28 to facilitate position signal modifying.

Referring to FIG. 29, the block of codes 1050 for directing the modifier processor circuit 1040 shown in FIG. 28 to perform position signal modifying functions, begins with block 1112 which directs the modifier processor 1042 shown in FIG. 28 to receive at least one signal representing the first, second, and intermediate positions relative to the ground of the first, second, and intermediate locations respectively of the header 1002 shown in FIG. 27. Block 1112 directs the modifier processor 1042 shown in FIG. 28 to cause the I/O interface 1048 to receive the first, intermediate, and second position signals 962, 964, and 966 via the input ports 1084, 1082, and 1080 shown in FIG. 28 and to store a position record based on the first, intermediate, and second position signals in the locations 1066 of the variable memory 1046 shown in FIG. 28.

Referring to FIG. 30, an exemplary position record is shown at 1140 and includes a first position field 1142, a second position field 1144, and an intermediate position field 1146. Block 1112 directs the modifier processor 1042 to store digital representations of positions represented by the first, second, and intermediate position signals 962, 966, and 964 shown in FIG. 26 in the first, second, and intermediate position fields 1142, 1144, and 1146 of the position record 1140. The digital representations act as representations of the first position, the second position, and the intermediate position of the first, second, and intermediate locations of the header 1002 shown in FIG. 27.

Referring back to FIG. 29, block 1114 then directs the modifier processor 1042 of FIG. 28 to determine whether the intermediate position meets a reference surface proximity criterion. To do this, block 1114 directs the modifier processor 1042 to retrieve a threshold intermediate value from the variable memory 1046. The threshold intermediate value represents a threshold intermediate distance under which the header 1002 shown in FIG. 27 is considered to be close to the ground. The threshold intermediate value may be previously set by a user of the modifier 960 such as, for example, by an input device. The threshold intermediate value may represent a separation distance of about 0.5 inches, for example.

Block 1114 of FIG. 29 directs the modifier processor 1042 of FIG. 28 to determine whether the intermediate position represented by the intermediate position field 1146 of the position record 1140 shown in FIG. 30 represents a separation distance that is less than the threshold intermediate distance represented by the threshold intermediate value. If the intermediate position represents a separation distance that is less than the threshold intermediate distance, block 1114 of FIG. 29 directs the modifier processor 1042 to proceed to block 1116. If the intermediate position represents a separation distance that is not less than the threshold intermediate distance, block 1114 directs the modifier processor 1042 to proceed to block 1118.

In an alternative embodiment, the reference surface proximity criterion may be met only if the intermediate position represents a separation distance of less than the threshold intermediate distance for more than a threshold period of time, such as 3 seconds, for example.

In the embodiment shown in FIG. 30, the intermediate position field 1146 contains a representation of an intermediate position of 0.3 inches relative to the ground which represents an intermediate separation distance of 1.5 inches which is less than the threshold intermediate distance of 0.5 inches. Thus, block 1114 of FIG. 29 directs the modifier processor 1042 of FIG. 28 to proceed to block 1116.

Referring to FIG. 29, block 1116 directs the modifier processor 1042 of FIG. 28 to produce and transmit to the positioning system at least one modified representative position signal representing at least one modified position that differs from the first and second positions.

In some embodiments, block 1116 directs the modifier processor 1042 to determine an intermediate deviation by determining a difference between the intermediate position and the threshold intermediate distance. In the embodiment shown in FIG. 30, the intermediate position field 1146 represents a separation distance of 0.3 inches. As discussed above, the threshold intermediate value represents a separation distance of 0.5 inches and so block 1116 directs the modifier processor 1042 to determine that the intermediate deviation is 0.5 inches-0.3 inches=0.2 inches. The intermediate deviation determined at block 1116 represents a proximity of the intermediate location of the header 1002 shown in FIG. 27 to the ground.

Referring still to FIG. 29, block 1116 then directs the modifier processor 1042 to derive a representative position record, such as exemplary representative position record 1180 shown in FIG. 31, and to store the representative position record 1180 in locations 1068 of the variable memory 1046 shown in FIG. 28.

Referring to FIG. 31, the representative position record 1180 includes a first representative position field 1182 for storing representation of a first representative position and a second representative position field 1184 for storing a representation of a second representative position.

Referring to FIG. 29, block 1116 directs the modifier processor 1042 to store in the first representative position field 1182 of the representative position record 1180 shown in FIG. 31, a representation of a difference between the first position represented by the first position field 1142 of the position record 1140 shown in FIG. 30 and the intermediate deviation discussed above. Accordingly, where the first position field 1142 represents 1.3 inches of separation distance and the intermediate deviation is 0.2 inches, as calculated above, block 1116 directs the modifier processor 1042 to store a representation of the difference (i.e., 1.1 inches) in the first representative position field 1182 shown in FIG. 31. In some embodiments, block 1116 may direct the modifier processor 1042 to scale the intermediate deviation up or down before subtracting it from the first position represented by the first position field 1182 and storing the difference in the first representative position field 1182 shown in FIG. 31.

Block 1116 similarly directs the modifier processor 1042 to store in the second representative position field 1184 a representation of a difference between the second position represented by the second position field 1144 of the position record 1140 shown in FIG. 30 and the intermediate deviation. The positions represented by the contents of the first and second representative position fields 1182 and 1184 differ from the first and second positions and act as modified positions.

Block 1116 directs the modifier processor 1042 to cause the output ports 1090 and 1092 of the I/O interface shown in FIG. 28 to cause the first and second representative position signals 970 and 972 to represent the modified positions represented by the first and second representative position fields 1182 and 1184 shown in FIG. 31. In various embodiments, block 1116 may direct the modifier processor 1042 to cause the output ports 1090 and 1092 to set the first and second representative position signals 970 and 972 to respective voltages representing the modified positions represented by the first and second representative position fields 1182 and 1184.

In various embodiments, the modified positions represent an offset of the first and second positions wherein a magnitude of the offset is based on a proximity of the intermediate position to the ground. In various embodiments, because the modified positions represent positions that are closer to the ground than the first and second positions, the controller 18 shown in FIG. 26 receiving the first and second representative position signals 970 and 972 may be more likely to cause the positioning system 22 to move the header 1002 shown in FIG. 27 upwards in response to the first and second representative position signals 970 and 972 than if the controller 18 received the first and second position signals 962 and 966.

In some embodiments, the intermediate position may not meet the reference surface proximity criterion. For example, the intermediate position represented by the intermediate position field 1146 shown in FIG. 30 may be greater than the threshold intermediate distance and thus block 1114 of FIG. 29 directs the modifier processor 1042 of FIG. 28 to proceed to block 1118.

Block 1118 of FIG. 29 directs the modifier processor 1042 of FIG. 28 to produce and transmit to the controller 18 shown in FIG. 26 at least one representative position signal representing the first and the second positions.

In various embodiments, block 1118 of FIG. 29 directs the modifier processor 1042 of FIG. 28 to derive a representative position record, such as exemplary representative position record 1200 as shown in FIG. 32, and to store the representative position record 1200 in locations 1068 of the variable memory 1046 shown in FIG. 28. Referring to FIG. 32, the representative position record 1200 has the same format as the representative position record 1180 shown in FIG. 31. Block 1118 of FIG. 29 directs the modifier processor 1042 of FIG. 28 to copy the representations of the first and second positions from the first and second position fields 1142 and 1144 of the position record 1140 shown in FIG. 30 into first and second representative position fields 1202 and 1204 of the representative position record 1200 shown in FIG. 32.

Block 1118 of FIG. 29 then directs the modifier processor 1042 of FIG. 28 to cause the output ports 1090 and 1092 of the I/O interface shown in FIG. 28 to cause the first and second representative position signals 970 and 972 to represent the positions represented by the first and second representative position fields 1202 and 1204 shown in FIG. 32. Accordingly, block 1118 directs the modifier processor 1042 to relay the first and second positions represented by the received first and second positions signals 962 and 966 on to the controller 18 shown in FIG. 26.

Referring to FIG. 29, after block 1116 or block 1118 has been executed, the modifier processor 1042 is directed to return to block 1112.

Alternatively, a sensor system similar to the sensor system 950 shown in FIG. 26 may include one or more intermediate sensors. For example, the sensor system may include two or more intermediate sensors configured to sense respective intermediate positions of respective intermediate locations of the header 1002 shown in FIG. 27. In such an embodiment, the modifier 960 is configured to apply a selection criterion to the intermediate positions represented by intermediate sensor signals to select one of the intermediate positions and then use it as the intermediate position in the process shown in FIG. 29. For example, applying the selection criterion may involve selecting the intermediate position that represents a separation distance that is closest to the ground.

In an alternative embodiment, the header 1002 shown in FIG. 27 includes a cutter bar that is configured to be pushed up by rising ground or terrain. In such an embodiment, a hydraulic pressure sensor for sensing hydraulic pressure in a hydraulic cylinder coupled to the cutter bar may act as the intermediate sensor. The pressure sensor may sense position or height of the header 1002 by sensing backpressure or differential pressure in the hydraulic cylinder coupled to the cutter bar.

While the above has been described having regard to an agricultural combine harvester including a header, which acts as an agricultural implement, mounted to a propulsion and processing unit, in various embodiments, similar methods, systems and apparatuses to those described above may be used in connection with other agricultural implements, such as, for example, a spray boom on a power unit.

While specific embodiments of the invention have been described and illustrated, such embodiments should be considered illustrative of the invention only and not as limiting the invention as construed in accordance with the accompanying claims.

The embodiments of the invention in which an exclusive property or privilege is claimed are defined as follows:

1. An apparatus for conditioning at least one control signal transmitted by a controller and normally received by a positioning system and configured to cause movement of an agricultural implement relative to a frame towards at least one desired position, the positioning system having a positioning response time for causing the agricultural implement to respond to said at least one control signal, the apparatus comprising at least one processor configured to:
   intercept said at least one control signal; and
   in response to said intercept of said at least one control signal, produce at least one output signal for receipt by the positioning system instead of said at least one control signal, said at least one output signal representing a plurality of active times during which said positioning system is instructed to move the agricultural implement towards the at least one desired position and a plurality of inactive times during which said positioning system is instructed not to move, each active time being followed by a respective one of the plurality of inactive times;
   wherein each of said plurality of inactive times has a respective time length determined to permit the agricultural implement to settle into a fixed position due to said positioning response time.

2. The apparatus of claim 1 wherein said at least one processor is configured to cause a first active time of said plurality of active times to have a length equal to a first active time length.

3. The apparatus of claim 2 wherein the first active time length is between about 10 and about 40 milliseconds.

4. The apparatus of claim 3 wherein the first active time length is about 20 milliseconds.

5. The apparatus of claim 2 wherein said at least one processor is configured to determine said first active time length.

6. The apparatus of claim 5 wherein said at least one processor is configured to:
   receive at least one system information signal representing system information; and derive the first active time length from the system information.

7. The apparatus of claim 6 wherein the system information comprises a controller identifier identifying the controller.

8. The apparatus of claim 6 wherein the system information includes user-defined speed information representing a desired speed at which the user wishes the positioning system to move the agricultural implement.

9. The apparatus of claim 6 wherein the system information comprises at least one of:
hydraulic pressure information representing a hydraulic pressure associated with the positioning system;
travel speed information representing a travel speed of the agricultural implement;
acceleration information representing acceleration of the agricultural implement;
fill level information representing a fill level and associated mass of the frame;
engine speed information representing an engine speed of an engine powering the positioning system;
hydraulic fluid temperature information representing a hydraulic fluid temperature of a hydraulic fluid reservoir of the positioning system;
fuel consumption rate information representing a fuel consumption rate and associated engine load of the positioning system; and
an implement identifier identifying the agricultural implement and an associated inertia.

10. The apparatus of claim 2 wherein said at least one processor is configured to cause a first inactive time following said first active time to have a first inactive time length.

11. The apparatus of claim 10 wherein the first inactive time length is between about 280 milliseconds and about 310 milliseconds.

12. The apparatus of claim 11 wherein the first inactive time length is about 300 milliseconds.

13. The apparatus of claim 11 wherein the controller is associated with a sampling interval, and wherein said at least one processor is configured to cause said first inactive time length to be equal to a difference between the active time length and the sampling interval.

14. The apparatus of claim 1 wherein said at least one processor is configured to:
determine whether the at least one control signal meets a continuous control criterion;
produce at least one continuous control signal representing said at least one control signal for receipt by said positioning system when the at least one control signal meets the continuous control criterion; and
produce said at least one output signal only if the at least one control signal does not meet the continuous control criterion.

15. The apparatus of claim 14 wherein said at least one processor is configured to determine whether the at least one control signal meets the continuous control criterion by determining whether the at least one control signal is configured to move the agricultural implement for more than a threshold control time.

16. The apparatus of claim 15 wherein the threshold control time is between about 1.0 seconds and about 2.0 seconds.

17. The apparatus of claim 15 wherein the threshold control time is about 1.5 seconds.

18. The apparatus of claim 1 wherein said at least one processor is configured to:
receive the at least one control signal at a first time;
produce a first set of output signal portions in response to said at least one control signal received at said first time, said first set of output signal portions representing an active time of the plurality of active times followed by an inactive time of the plurality of inactive times;
receive the at least one control signal at a second time following the inactive time represented by the first set of output signal portions; and
produce a second set of output signal portions in response to said at least one control signal received at said second time, said second set of output signal portions representing an active time of the plurality of active times followed by an inactive time of the plurality of inactive times.

19. The apparatus of claim 1 wherein said at least one processor is configured to:
receive at least one position signal representing at least one position of the agricultural implement;
receive at least one desired position signal representing the at least one desired position of the agricultural implement; and
derive said at least one control signal from at least one difference between said at least one position and said at least one desired position.

20. A method for conditioning at least one control signal transmitted by a controller and normally received by a positioning system and configured to cause movement of an agricultural implement relative to a frame towards at least one desired position, the positioning system having a positioning response time for causing the agricultural implement to respond to said at least one control signal, the method comprising:
intercepting said at least one control signal; and
in response to intercepting said at least one control signal, producing at least one output signal for receipt by the positioning system instead of said at least one control signal, said at least one output signal representing a plurality of active times during which said positioning system is instructed to move the agricultural implement towards the at least one desired position and a plurality of inactive times during which said positioning system is instructed not to move, each active time being followed by a respective one of the plurality of inactive times;
wherein each of said plurality of inactive times has a respective time length determined to permit the agricultural implement to settle into a fixed position due to said positioning response time.

21. A method of operating an agricultural implement on an agricultural vehicle, the method comprising:
causing a controller of the agricultural implement to produce at least one control signal for causing a positioning system to move the agricultural implement up or down relative to the ground or to not move the agricultural implement up or down;
executing the method of claim 20 to intercept said at least one control signal and to produce said at least one output signal and causing said at least one output signal to be provided to said positioning system instead of said at least one control signal produced by said controller; and
causing the positioning system to move the agricultural implement up or down or to stay in a current position, in response to said at least one output signal.

22. A non-transitory computer-readable medium having stored thereon codes which, when executed by at least one processor, cause the at least one processor to condition at least one control signal transmitted by a controller and normally received by a positioning system and configured to cause movement of an agricultural implement relative to a frame towards at least one desired position, the positioning system having a positioning response time for causing the agricultural implement to respond to said at least one control signal, wherein the codes, when executed by the at least one processor, cause the at least one processor to:
intercept said at least one control signal; and
in response to said intercept of said at least one control signal, produce at least one output signal for receipt by the positioning system instead of said at least one control signal, said at least one output signal representing a plurality of active times during which said positioning system is instructed to move the agricultural implement towards the at least one desired position and a plurality of inactive times during which said positioning system is instructed not to move, each active time being followed by a respective one of the plurality of inactive times;
wherein each of said plurality of inactive times has a respective time length determined to permit the agricultural implement to settle into a fixed position due to said positioning response time.

23. An agricultural implement control system for moving an agricultural implement up and down or for holding the agricultural implement at a height above the ground over which an agricultural vehicle is driven, the agricultural implement control system comprising:
a positioning system operably configured to move the agricultural implement up or down or to not move the agricultural implement up or down, in response to at least one control signal;
a controller operably configured to produce said at least one control signal; and
a conditioner operably configured to:
intercept said at least one control signal; and
in response to said intercept of said at least one control signal, produce at least one output signal for receipt by the positioning system instead of said at least one control signal, said at least one output signal representing a plurality of active times during which said positioning system is instructed to move the agricultural implement towards the at least one desired position and a plurality of inactive times during which said positioning system is instructed not to move, each active time being followed by a respective one of the plurality of inactive times;
wherein each of said plurality of inactive times has a respective time length determined to permit the agricultural implement to settle into a fixed position due to a positioning response time for causing the agricultural implement to respond to said at least one control signal.

24. A vehicle comprising the agricultural implement control system of claim 23.

25. An apparatus for producing at least one control signal for controlling a positioning system, the positioning system having a positioning response time for causing an agricultural implement to move in response to said at least one control signal, the apparatus comprising at least one processor configured to:
receive at least one position signal representing at least one position of the agricultural implement;
receive at least one desired position signal representing at least one desired position of the agricultural implement;
derive said at least one control signal from at least one difference between said at least one position and said at least one desired position; and
produce said at least one control signal for receipt by said positioning system, said at least one control signal representing a plurality of active times during which said positioning system is instructed to move the agricultural implement towards the at least one desired position and a plurality of inactive times during which said positioning system is instructed not to move, each active time being followed by a respective one of the plurality of inactive times;
wherein each of said plurality of inactive times has a respective time length determined to permit the agricultural implement to settle into a fixed position due to said positioning response time.

26. An agricultural implement control system for moving an agricultural implement up and down or for holding the agricultural implement at a height above the ground over which an agricultural vehicle is driven, the agricultural implement control system comprising:
a positioning system operably configured to move the agricultural implement up or down or to not move the agricultural implement up or down, in response to at least one control signal;
a controller operably configured to produce said at least one control signal; and
a conditioner comprising an apparatus according to claim 1, the conditioner operably configured to:
intercept said at least one control signal; and
in response to said intercept of said at least one control signal, produce at least one output signal for receipt by the positioning system instead of said at least one control signal, said at least one output signal representing a plurality of active times during which said positioning system is instructed to move the agricultural implement towards the at least one desired position and a plurality of inactive times during which said positioning system is instructed not to move, each active time being followed by a respective one of the plurality of inactive times;
wherein each of said plurality of inactive times has a respective time length determined to permit the agricultural implement to settle into a fixed position due to a positioning response time for causing the agricultural implement to respond to said at least one control signal.

27. A vehicle comprising the agricultural implement control system of claim 26.

* * * * *